(12) United States Patent
Aichi et al.

(10) Patent No.: US 8,179,546 B2
(45) Date of Patent: May 15, 2012

(54) PRINTING USING A PORTABLE COMMUNICATION APPARATUS

(75) Inventors: Takao Aichi, Tokyo (JP); Akitoshi Yamada, Yokohama (JP); Yusuke Hashii, Kawasaki (JP); Hiromitsu Hirabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1166 days.

(21) Appl. No.: 11/658,589

(22) PCT Filed: Aug. 25, 2005

(86) PCT No.: PCT/JP2005/015957
§ 371 (c)(1),
(2), (4) Date: Jan. 26, 2007

(87) PCT Pub. No.: WO2006/022429
PCT Pub. Date: Mar. 2, 2006

(65) Prior Publication Data
US 2008/0309961 A1    Dec. 18, 2008

(30) Foreign Application Priority Data

Aug. 27, 2004  (JP) ................................. 2004-249020

(51) Int. Cl.
*G06K 15/00* (2006.01)
*G06F 3/12* (2006.01)
(52) U.S. Cl. ....... 358/1.15; 358/1.14; 358/1.9; 709/219; 348/231.3; 348/207.1; 348/207.2
(58) Field of Classification Search .................. 358/1.14, 358/1.15, 1.9, 1.13–1.18; 348/207.1–222.1; 709/219
See application file for complete search history.

(56) References Cited

U.S. PATENT DOCUMENTS

| 6,273,535 | B1 * | 8/2001 | Inoue et al. ....................... 347/3 |
| 6,628,417 | B1 * | 9/2003 | Naito et al. .................. 358/1.15 |
| 6,744,528 | B2 * | 6/2004 | Picoult et al. ................ 358/1.15 |
| 7,069,341 | B2 * | 6/2006 | Leclair et al. .................. 709/246 |
| 7,167,262 | B2 * | 1/2007 | Muramoto et al. .......... 358/1.15 |
| 7,274,478 | B2   | 9/2007 | Oshima et al. |

(Continued)

FOREIGN PATENT DOCUMENTS

EP    0738956 A2    10/1996
(Continued)

OTHER PUBLICATIONS

European Search Report dated Jan. 19, 2010 in European Patent Application No. 05777049.7.

(Continued)

*Primary Examiner* — Twyler Haskins
*Assistant Examiner* — Dennis Dicker
(74) *Attorney, Agent, or Firm* — Fitzpatrick, Cella, Harper & Scinto

(57) ABSTRACT

In a print system for causing a printer to print an image on the basis of image data supplied from a portable communication apparatus by direct communication between the portable communication apparatus and the printer, the print function of the printer is obtained. When print conditions input by using the UI of the portable communication apparatus cannot be implemented by the print function of the printer, the portable communication apparatus requests a server to execute corresponding processing. A result processed by the server is received, and the printer is caused to print the image.

25 Claims, 16 Drawing Sheets

U.S. PATENT DOCUMENTS

| | | | |
|---|---|---|---|
| 7,304,757 B2* | 12/2007 | Parry et al. | 358/1.15 |
| 7,330,286 B2* | 2/2008 | Fukasawa | 358/1.9 |
| 7,375,848 B2* | 5/2008 | Nakami et al. | 358/1.9 |
| 7,471,312 B2* | 12/2008 | Toyoda | 348/222.1 |
| 7,864,351 B2* | 1/2011 | Honma | 358/1.15 |
| 2002/0122201 A1* | 9/2002 | Haraguchi et al. | 358/1.15 |
| 2003/0053118 A1* | 3/2003 | Muramoto et al. | 358/1.15 |
| 2003/0086114 A1* | 5/2003 | Cherry et al. | 358/1.15 |
| 2003/0174351 A1 | 9/2003 | Kawanabe et al. | |
| 2003/0187965 A1 | 10/2003 | Enomoto et al. | |
| 2004/0135889 A1* | 7/2004 | Koizumi et al. | 348/207.1 |
| 2004/0184078 A1* | 9/2004 | Endo et al. | 358/1.15 |
| 2004/0223185 A1 | 11/2004 | Yamada et al. | |
| 2005/0099647 A1 | 5/2005 | Aichi | |
| 2005/0117026 A1* | 6/2005 | Koizumi et al. | 348/222.1 |
| 2005/0128528 A1 | 6/2005 | Yamada et al. | |
| 2005/0213152 A1* | 9/2005 | Suzuki et al. | 358/1.15 |
| 2007/0052995 A1* | 3/2007 | Kudlu et al. | 358/1.15 |
| 2007/0201095 A1 | 8/2007 | Kawanabe et al. | |
| 2010/0225966 A1* | 9/2010 | Bailey et al. | 358/1.15 |

FOREIGN PATENT DOCUMENTS

| | | |
|---|---|---|
| JP | 2001189886 | 7/2001 |
| JP | 2003-233472 A | 8/2003 |
| JP | 2003-246115 A | 9/2003 |
| JP | 2004032373 | 1/2004 |
| JP | 2004173313 | 6/2004 |
| JP | 2004179827 | 6/2004 |
| JP | 2004312469 | 11/2004 |
| KR | 2003-0096644 | 12/2003 |
| WO | 02/46905 A1 | 6/2002 |

OTHER PUBLICATIONS

Office Action, dated Apr. 30, 2008, in KR 10-2007-7006656.

* cited by examiner

PRINTING USING A PORTABLE COMMUNICATION APPARATUS

TECHNICAL FIELD

The present invention relates to a print system which causes a printer to print an image on the basis of image data supplied from a portable communication apparatus by direct communication between the portable communication apparatus and the printer, a portable communication apparatus, and a control method thereof.

BACKGROUND ART

In recent years, digital cameras capable of sensing an image and outputting the sensed image as digital image data are widely used. Cellular phones having such a camera function are also becoming popular. To print an image sensed by a camera or cellular phone and use it as a photo, normally, the digital image data is temporarily captured from the digital camera or cellular phone to a PC (personal computer). After image processing is executed by the PC, the image data is output from the PC to a printer such as a color printer and printed.

Recently, a color print system capable of transmitting digital image data directly from a camera to a printer without intervening a PC and printing the image data, and a so-called photo-direct (PD) printer capable of inserting a memory card, which is loaded in a camera to store sensed image data, directly in a color printer, and reading out and printing the image data stored in the memory card are also developed. Especially, a system which can directly transfer image data from a camera to a color printer through an interface such as a USB and print the image data is called a camera direct, USB direct, or digital camera direct print and is beginning to widely penetrate among users who are not good at PC operations. Since an industrial standard specification "PictBridge" which defines the communication protocol in camera direct print has been announced recently, transmitting image data directly from a camera to a printer and printing the data are becoming prevalent.

Printers which employ the camera direct print function are commercially available now. Along with this, new solutions for cellular phones with a camera function also begin to appear so that an image sensed by a cellular phone is transferred directly to a printer and printed by employing the direct print function.

In PictBridge, image data corresponding to the Capability of a printer is supplied from an image supply device (digital camera or cellular phone) to the printer. Many images sensed by the above-described cellular phone having a camera function are encoded by EXIF/JPEG. The printer can also cope with EXIF/JPEG as an image format. Upon printing using such printer, encoded image data is sent directly to the printer through a USB cable.

Many printers can process only the EXIF/JPEG image format which is suitable for photo print. It is however expected that cellular phones will be able to handle a variety of image formats in the future to meet the demands of the market.

Especially for cellular phone users, various kinds of communication services using the Internet or original communication networks are provided, including mail services as a representative one. The mail services include a service to attach photo image data or data of another format to mail, which allows users to exchange image data of various formats. Hence, in camera direct print, a desire to handle image data of various kinds of formats except the above-described image format will arise obviously.

However, since resources that can be installed in a printer are limited, it is very difficult to cope with such a variety of image formats. Since even a digital camera or cellular phone cannot be equipped with all functions to cope with the variety of image formats, it is not practical to cope with all image formats.

To connect such a camera to the Internet and execute image processing impossible for the camera, a technique has been proposed (Japanese Patent Laid-Open No. 2001-189886), in which image data is transferred to a server on the Internet to cause the server to manipulate and convert the sensed image, and the converted image data is received.

However, in the above-described technique of Japanese Patent Laid-Open No. 2001-189886, at most, functions unavailable in a camera are executed by a server. When a camera and a printer are connected to execute print, functions (e.g., N-up print or date print) out of the Capability of the printer cannot be implemented. In the conventional mechanism, an N-up print or date print designation can be selected on the camera-side UI in accordance with the Capability of the printer. If the function (N-up or date print) is not included in the Capability of the printer, there is no means to instruct print by operations on the cellular phone side.

DISCLOSURE OF INVENTION

It is an object of the present invention to overcome the drawbacks of the prior arts.

A characteristic feature of the present invention is to provide portable communication apparatus and print system which can execute print by implementing a function unavailable in the portable communication apparatus or a printer by causing a server to execute the function unavailable in the printer when image data is supplied directly from the portable communication apparatus to the server to execute print, and a control method thereof.

According to an aspect of the present invention, there is provided with a print system for causing a printer to print an image on the basis of image data supplied from a portable communication apparatus by direct communication between the portable communication apparatus and the printer, comprises:

obtaining means for obtaining a print function of the printer;

input means for inputting print conditions;

means for, in a case where the print conditions input by the input means are not within the print function of the printer obtained by the obtaining means, causing the portable communication apparatus to request a server to execute corresponding processing; and print control means for controlling to cause the printer to print the image on the basis of a result processed by the server.

Further, according to an aspect of the present invention, there is provided with a portable communication apparatus for supplying image data to a printer and causing the printer to print the image data by direct communication with the printer, comprising:

obtaining means for obtaining a print function of the printer;

input means for inputting print conditions;

means for, in a case where the print conditions input by the input means are not within the print function of the printer obtained by the obtaining means, requesting, through a communication network, a server to execute corresponding processing; and print control means for controlling to cause the printer to print the image on the basis of a result processed by the server.

Other features, objects and advantages of the present invention will be apparent from the following description when taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will be described below in detail with reference to the accompanying drawings. The following embodiments are not intended to limit the appended claims of the present invention, and not all combinations of features described in the embodiments are essential for the solving means of the present invention. In the embodiments to be described below, a cellular phone obtains the Capability of a printer at the time of confirming the connection or before the start of print. The cellular phone can be connected to the Internet and transmit/receive data to/from a server through the Internet. Further, although the embodiments are explained in a case where a cellular phone is used as an image supply device, the present invention is not limited to the case of the cellular phone, and a portable communications apparatus such as a PDA, a mobile PC and the like may be applied.

Figure 1:
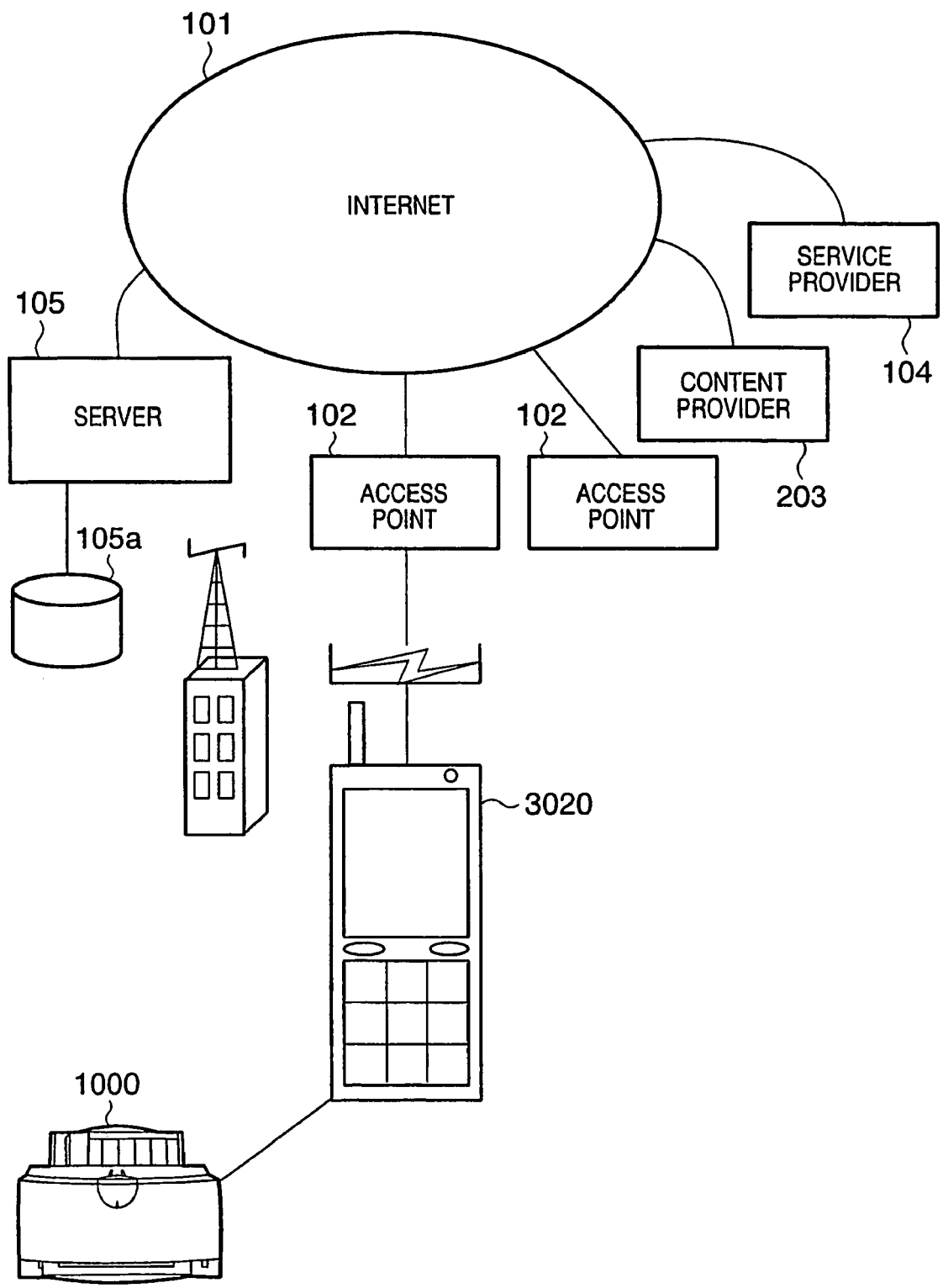
FIG. 1 depicts a view for explaining a print system according to an embodiment of the present invention.

FIG. 1 depicts a view for explaining a print system according to an embodiment of the present invention.

As the basic arrangement of the print system, communication is executed between a camera-equipped cellular phone (CP) 3020 and a photo direct printer (PD printer) 1000 through a general-purpose interface to supply image data from the CP 3020 to the PD printer 1000 and print the image data. The general-purpose interface includes a USB and a wireless interface such as IEEE.11B/G. The CP 3020 need not always have the camera function and may be able to receive image data from, e.g., a provider 104 or 203.

Referring to FIG. 1, an access point 102, service provider 104, server 105, and content provider 203 are connected to Internet 101. The CP 3020 can communicate with the Internet 101 through the access point 102. In this arrangement, the CP 3020 can receive various kinds of information provided from the service provider 104 and display them on the display unit of the CP 3020. Alternatively, the CP 3020 can receive music or image data provided from the content provider 203, save them in the memory of the CP 3020, display them on a display unit 35 (FIG. 2) of the CP 3020, or reproduce the data from a speaker 44 (FIG. 2) of the CP 3020 as an acoustic signal. The arrangement of the PD printer 1000 will be described later in detail.

To print an image sensed by the CP 3020, image data received from a provider, or an image received from another cellular phone, the CP 3020 confirms the function (Capability) of the PD printer 1000 connected through an interface. To print image data which cannot cope with the function of the PD printer 1000 or execute print in a print mode unavailable in the PD printer 1000, the image data is transmitted to the server 105 through the Internet 101 to make the server 105 convert the image data to an image format or image data adapted to the print conditions of the PD printer 1000. The converted image data is received from the server 105 through the Internet 101. The received converted image data is transmitted from the CP 3020 to the PD printer 1000 and printed.

If the amount of image data to be processed is large, and the server 105 is expected to take a long time to convert the image data, the image data is transmitted to the server 105 to make it convert the image data into an image format or image data adapted to the print conditions of the PD printer 1000. The converted image data is temporarily stored in the memory of the server 105. The CP 3020 receives a URL representing the address of the image data stored in the server 105 from the server 105. When the CP 3020 wants to print the image data, it accesses the URL to obtain the converted image data. The obtained image data is transmitted from the CP 3020 to the PD printer 1000 and printed.

Figure 2:
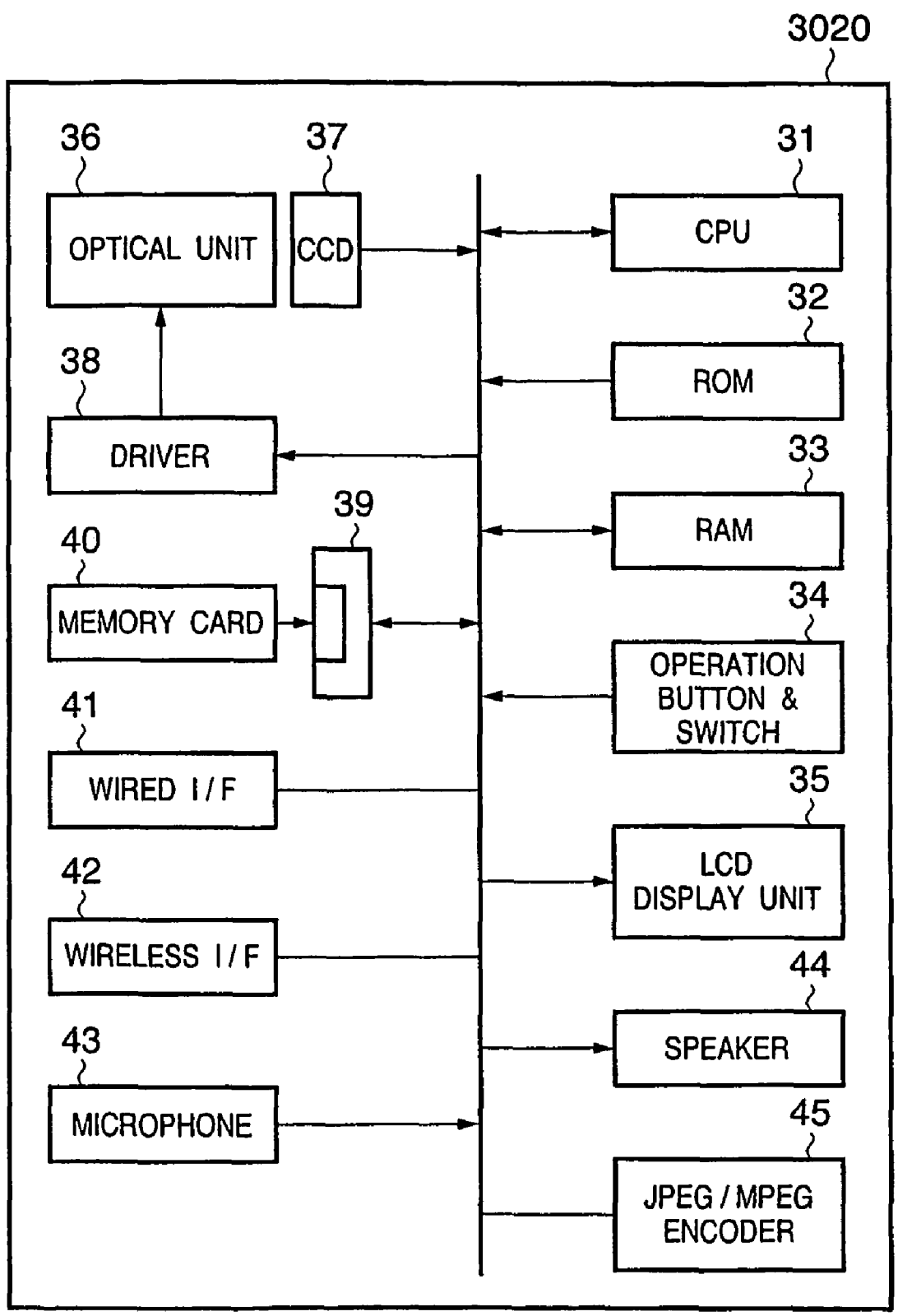
FIG. 2 is a block diagram showing the arrangement of a camera-equipped cellular phone (CP) according to the embodiment.

FIG. 2 is a block diagram showing the arrangement of the camera-equipped cellular phone (CP) 3020 according to this embodiment. The hardware of such a camera-equipped cellular phone is known and will be described briefly.

Referring to FIG. 2, a CPU 31 controls the entire CP 3020 in accordance with a control program stored in a ROM 32. The ROM 32 stores a program which describes processing procedures (firmware) to be executed by the CPU 31 (the firmware is formed from a writable nonvolatile memory such as a flash memory assuming that upgrading is executed appropriately). A RAM 33 is used as a work area during processing executed by the CPU 31 and temporarily stores various kinds of data. An operation button & switch group 34 includes a ten-key pad used to input numbers and characters, call key, and switches to instruct various kinds of functions. A liquid crystal display unit 35 is used to confirm, on the screen, an image sensed by using the camera function or an image stored in a memory card 40 or display a menu for various settings. The operation button & switch group 34 and display unit 35 function as the user interface of the entire system in implementing a direct print system. An optical unit 36 mainly has a lens and a driving system for it. A CCD element 37 converts an image formed by the optical unit 36 into an electrical signal. A driver 38 controls the optical unit 36 under the control of the CPU 31 to execute auto-focus control or stop adjustment. The memory card 40 is a storage medium such as a Compact Flash (registered trademark) memory card or Smart Media (registered trademark) and is connected to a bus through a connector 39. A wired interface 41 is a USB interface (slave side of the USB) to connect to a PC 3010 or the PD printer 1000 according to this embodiment. A wireless interface 42 causes the cellular phone to communicate with a base station. A microphone 43 and a speaker 44 are used in speech communication by the telephone. The speaker 44 is also used to reproduce, e.g., music contents received from a provider. A JPEG/MPEG encoder 45 encodes image data into JPEG or MPEG codes. As described above, the CP may have a wireless interface (not shown) to connect to the PD printer 1000. Although not illustrated in FIG. 2, a battery and an antenna are also included.

The basic arrangement of the camera-equipped cellular phone according to this embodiment has been described above. The cellular phone has various kinds of functions to be described below. The functions include, e.g., print processing in the printer, processing request to the server through the Internet, data transmission/reception to/from the server, calendar display, mail transmission/reception control, UI generation, and image processing based on the UI. These functions will be described later in detail.

Figure 3:
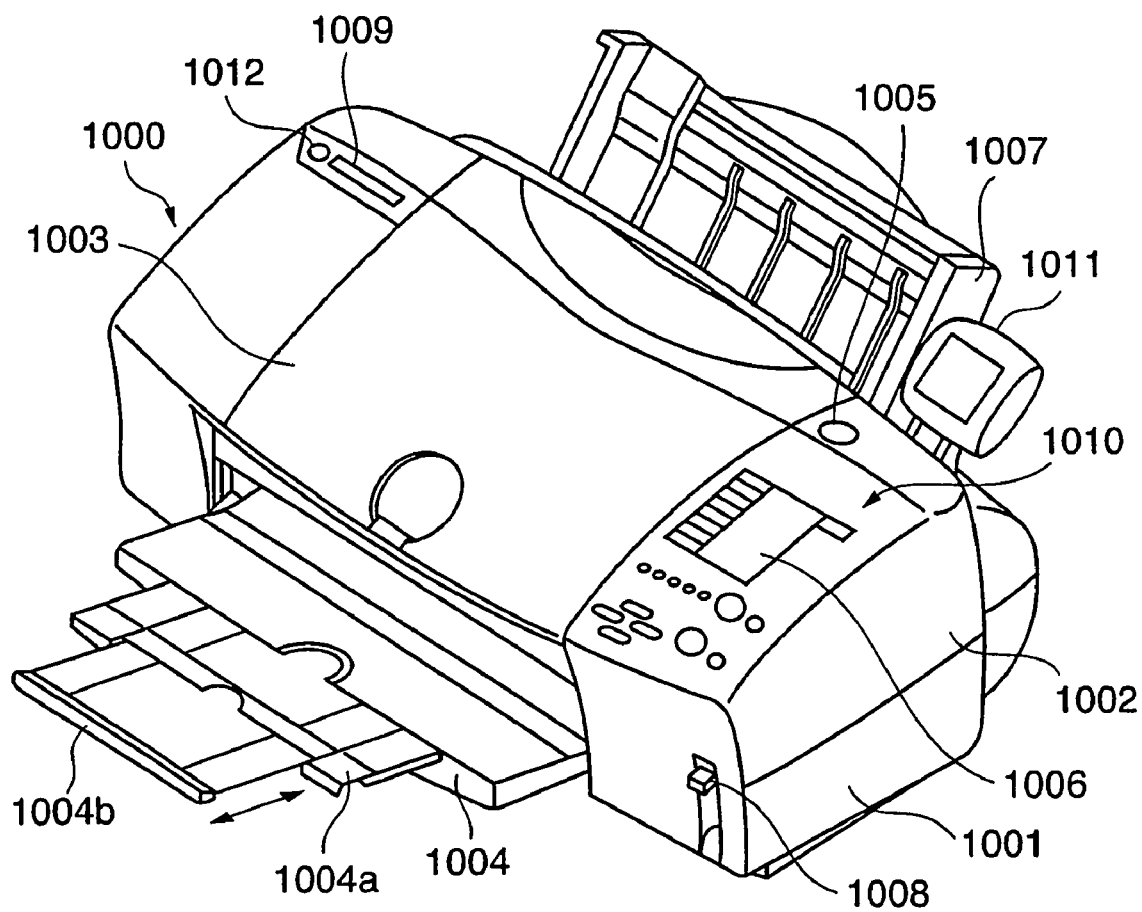
FIG. 3 depicts a perspective view showing the outer appearance of a photo direct printer according to the embodiment of the present invention.

FIG. 3 depicts a perspective view showing the outer appearance of the photo direct printer (to be referred to as a PD printer hereinafter) 1000 according to the embodiment of the present invention. The PD printer 1000 has a normal PC printer function of receiving data from a host computer (PC) and printing the data and a function of directly reading out and printing image data stored in a storage medium such as a memory card or receiving image data from a digital camera or PDA and printing the data.

Referring to FIG. 3, the main body as the outer shell of the PD printer 1000 according to this embodiment has exterior members including a lower case 1001, upper case 1002, access cover 1003, and discharge tray 1004. The lower case 1001 forms an approximate lower half part of the PD printer 1000, and the upper case 1002 forms an approximate upper half part of the main body. A hollow structure having a storage space inside is formed by combining the two cases to store mechanisms to be described later. Openings are formed in the upper and front surfaces. The discharge tray 1004 is rotatably held at its one end by the lower case 1001. The opening formed in the front surface of the lower case 1001 can be opened/closed by rotating the discharge tray 1004. In executing the print operation, the discharge tray 1004 is rotated to the front surface side to open the opening. Printed paper sheets (including plain paper, dedicated paper, and resin sheet; to be simply referred to as a sheet hereinafter) can be discharged from there. The discharged paper sheets can be stacked sequentially. Two auxiliary trays 1004a and 1004b are stored in the discharge tray 1004. When the trays are pulled out to the front as needed, the sheet support area can be increased or decreased in three steps.

The access cover 1003 is rotatably held at its one end by the upper case 1002. The opening formed in the upper surface can be opened/closed by rotating the access cover 1003. When the access cover 1003 is opened, a printhead cartridge (not shown) or ink tank (not shown) stored in the main body can be exchanged. Although not particularly illustrated here, when the access cover 1003 is opened/closed, a projection formed on its rear surface rotates a cover open/close lever. When the rotation position of the lever is detected by, e.g., a micro switch, the open/close state of the access cover 1003 can be detected.

A power key 1005 is provided on the upper surface of the upper case 1002. An operation panel 1010 having a liquid crystal display unit 1006 and various kinds of key switches is provided on the right side of the upper case 1002. The structure of the operation panel 1010 will be described later in detail with reference to FIG. 4. An automatic feeder 1007 automatically feeds sheets into the apparatus main body. A sheet clearance select lever 1008 adjusts the clearance between the printhead and a sheet. A card slot 1009 receives an adapter in which a memory card can be installed. Image data stored in the memory card can directly be fetched and printed through the adapter. As the memory card (PC), a Compact Flash (registered trademark) memory, Smart Media, or a memory stick can be used. A viewer (liquid crystal display unit) 1011 is detachable for the main body of the PD printer 1000. The viewer 1011 is used to display each frame image or an index image in, e.g., searching for an image to be printed from images stored in a PC card. A USB terminal 1012 is used to connect a digital camera (to be described later). A USB connector to connect a personal computer is provided on the rear surface of the PD printer 1000.

Figure 4:
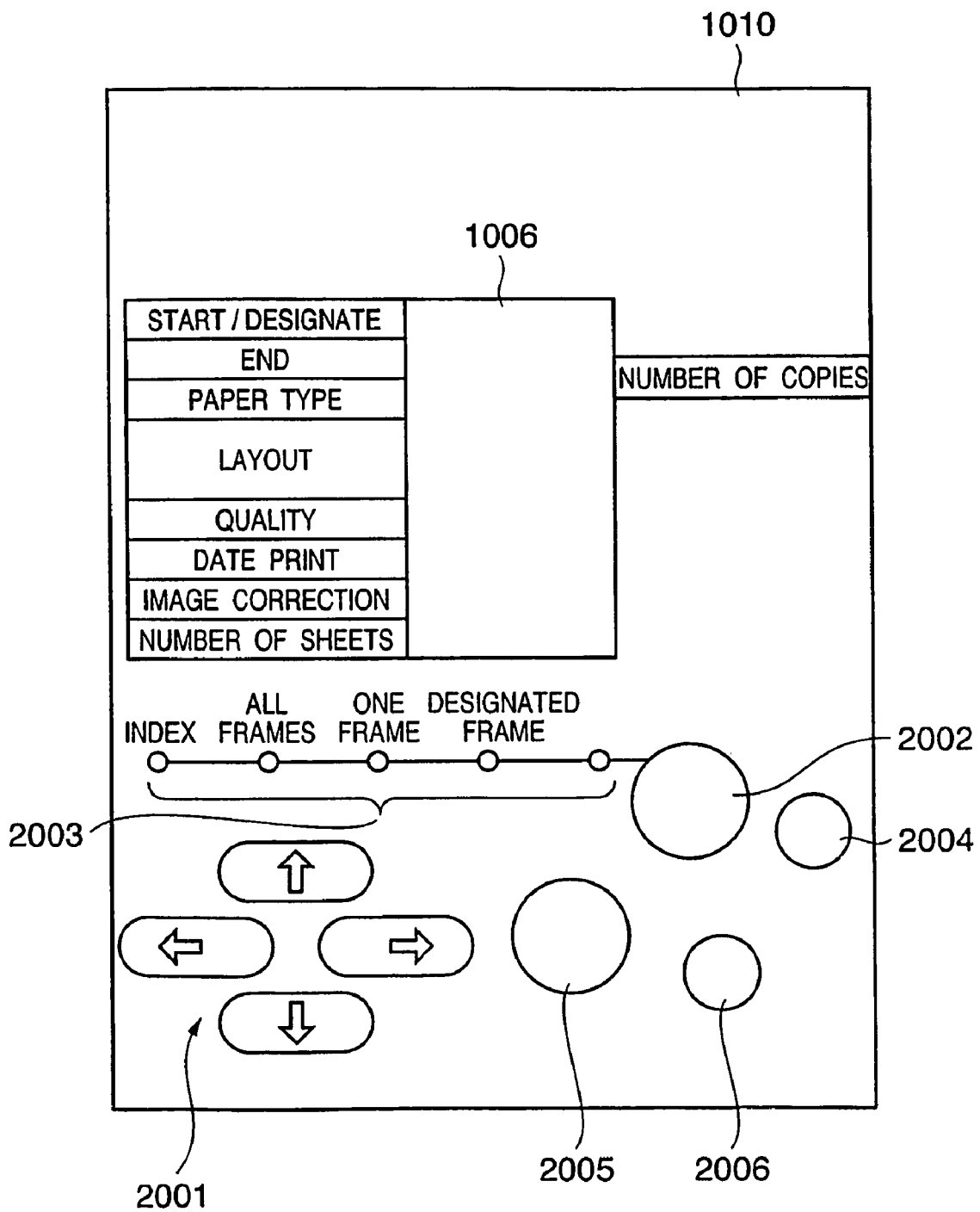
FIG. 4 depicts a view of the operation panel of the PD printer according to the embodiment.

FIG. 4 depicts a view of the operation panel 1010 of the PD printer 1000 according to this embodiment.

Referring to FIG. 4, the liquid crystal display unit 1006 displays menu items to set various data related to items printed on the right and left sides. The items to be displayed here include, e.g., the number of the first print target photo image of a plurality of photo image files, a designated frame number (start frame designation/print frame designation), the last photo number to be printed (end), the number of printouts (number of copies), the type of sheet to be used for print (paper type), the number of photos to be printed on one sheet (layout), designation of print quality (quality), designation of ON/OFF of photographing date print (date print), designation of ON/OFF of correction of photos (image correction), and the number of sheets necessary for print (number of sheets). These items are selected or designated by using a cursor key 2001. Every time a mode key 2002 is pressed, the type of print (e.g., index print, all frame print, one frame print, and designated frame print) can be changed, and a corresponding LED of an LED 2003 is turned on. A maintenance key 2004 is used for cleaning of the printhead or maintenance of the printer. A print start key 2005 is pressed to instruct the start of print or establish maintenance setting. A print stop key 2006 is pressed to stop print or instruct to stop maintenance.

The arrangement of main parts related to control of the PD printer 1000 according to the first embodiment will be described next with reference to FIG. 5. The same reference numerals as in the above-described drawings denote the same parts in FIG. 5, and a description thereof will be omitted.

Figure 5:
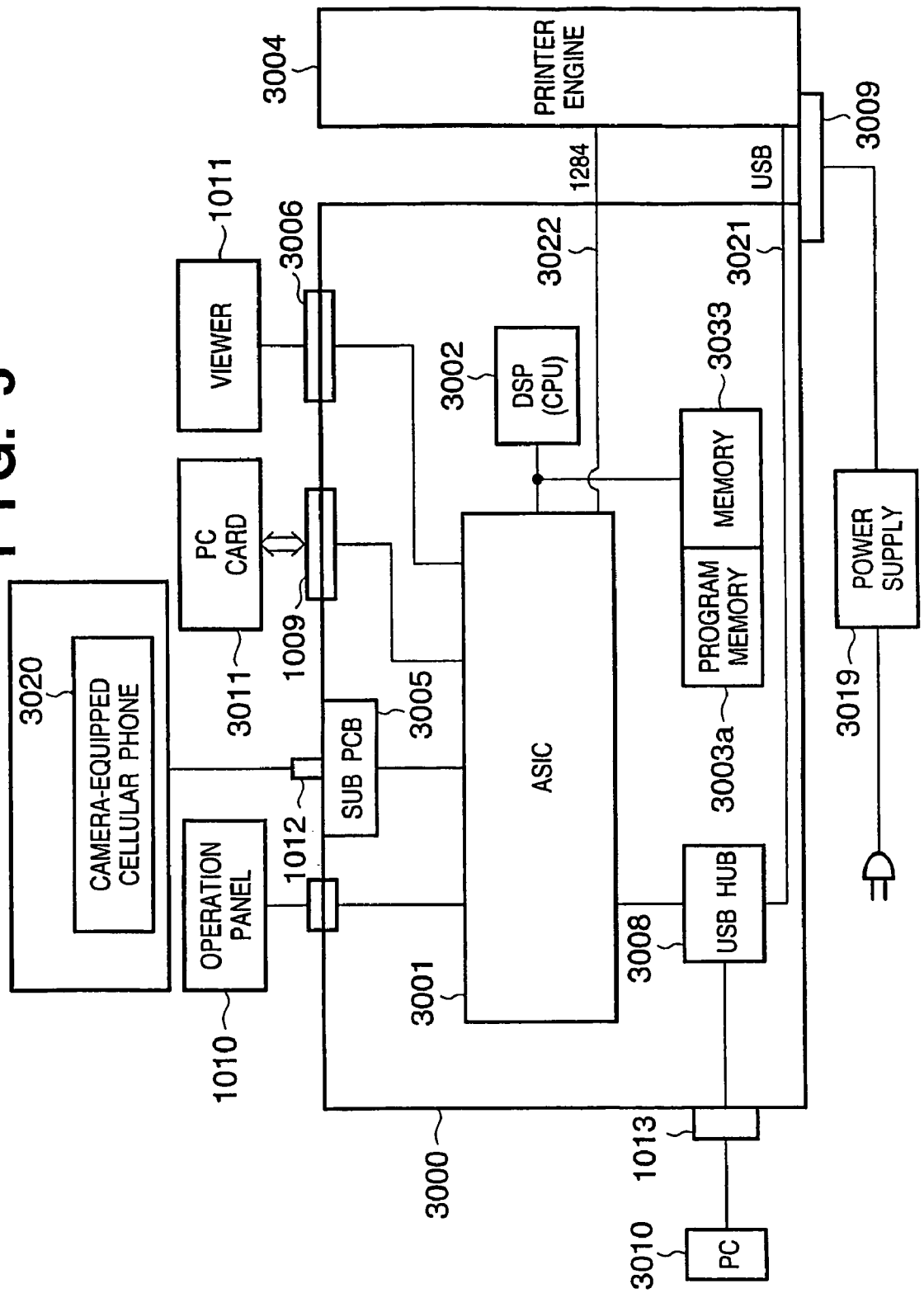
FIG. 5 is a block diagram showing the arrangement of main parts related to control of the PD printer according to the embodiment.

FIG. 5 is a block diagram showing the arrangement of main parts related to control of the PD printer according to this embodiment.

Referring to FIG. 5, reference numeral 3000 denotes a control unit (control board); numeral 3001 denotes an ASIC (dedicated custom LSI); numeral 3002 denotes a DSP (Digital Signal Processor). The DSP 3002 incorporates a CPU to execute various kinds of control processing (to be described later), conversion from a luminance signal (RGB) to a density signal (CMYK), and image processing such as scaling, gamma conversion, and error diffusion. A memory 3003 to store the control program of the CPU of the DSP 3002, a RAM area to store a program during execution, and a memory area which functions as a work memory to store image data. As a printer engine 3004, a printer engine for an ink-jet printer which prints a color image by using a plurality of color inks is mounted. A SUB-USB 3005 serving as a port to connect a digital camera (DSC) 3012. The SUB-USB 3005 has the connector 1012. The DSC 3012 or camera-equipped cellular phone (CP 3020) is connected to the connector 1012. A connector 3006 is used to connect the viewer 1011. When the PD printer 1000 executes print on the basis of image data from the PC 3010, a USB hub 3008 passes the data from the PC 3010 and outputs the data to the printer engine 3004 through a USB 3021. With this arrangement, the connected PC 3010 can directly exchange data and signals with the printer engine 3004 and execute print (the printer functions as a general PC printer). A power connector 3009 receives a DC voltage converted from a commercial AC voltage by a power supply 3019. The PC 3010 is a general personal computer. Reference numeral 3011 denotes the above-described memory card (PC card); and numeral 3012 denotes the digital camera (DSC: Digital Still Camera).

Signal exchange between the control unit 3000 and the printer engine 3004 is done through the above-described USB 3021 or IEEE 1284 bus 3022.

Figure 6:
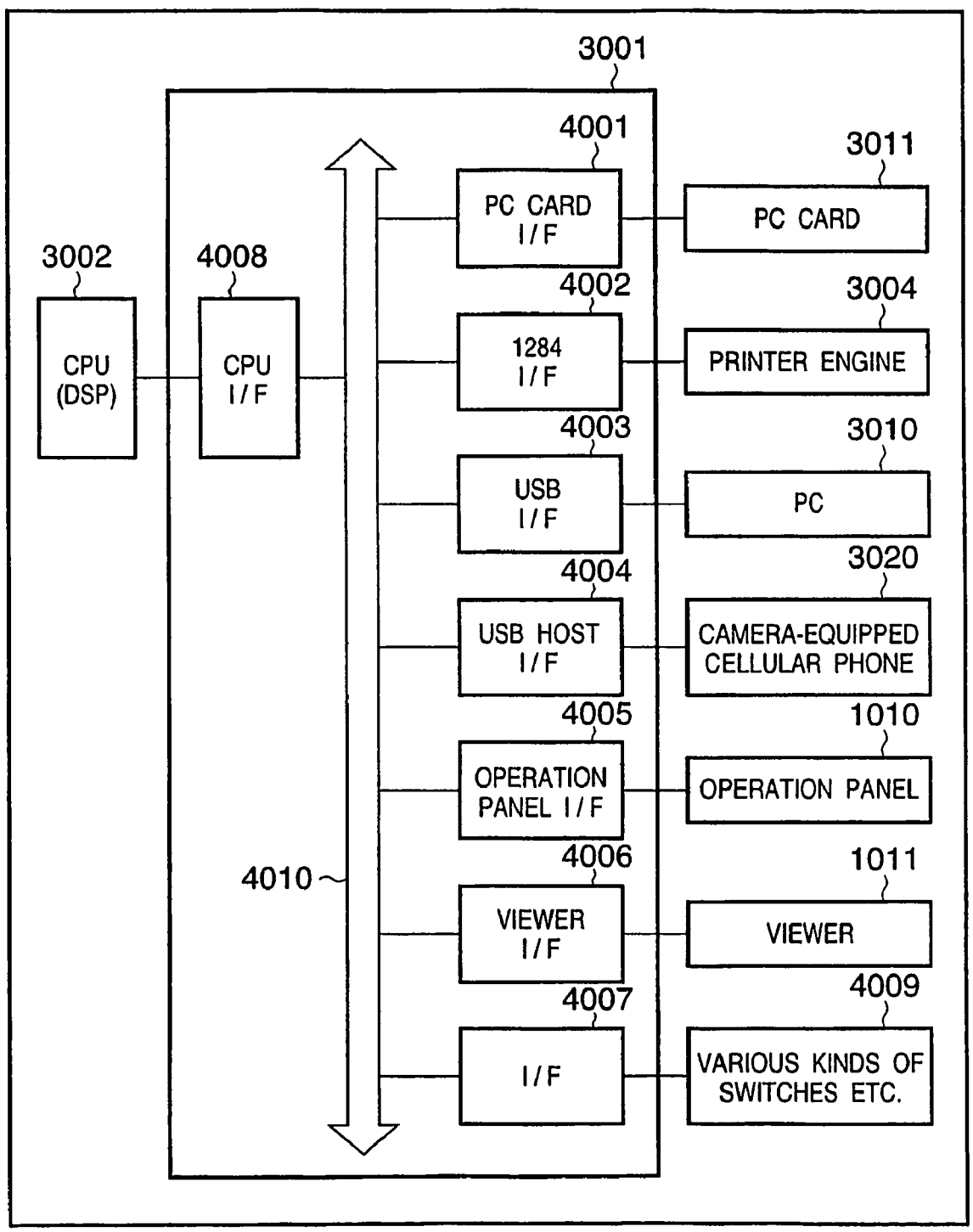
FIG. 6 is a block diagram showing the arrangement of the ASIC of the PD printer according to the embodiment.

FIG. 6 is a block diagram showing the arrangement of the ASIC 3001 of the PD printer 1000 according to this embodiment. The same reference numerals as in the above-described drawings denote the same parts in FIG. 6, and a description thereof will be omitted.

A PC card interface unit 4001 reads image data stored in the installed PC card 3011 or writes data in the PC card 3011. An IEEE 1284 interface unit 4002 exchanges data with the printer engine 3004. The IEEE 1284 interface unit 4002 is a bus used in printing image data received from the DSC 3012 or CP 3020 or stored in the PC card 3011. A USB interface unit 4003 exchanges data with the PC 3010. A USB host interface unit 4004 exchanges data with the connected DSC 3012 or CP 3020. An operation panel interface unit 4005 inputs various kinds of operation signals from the operation panel 1010 or outputs display data to the display unit 1006. A viewer interface unit 4006 controls display of image data on the viewer 1011. An interface unit 4007 controls the interface to various kinds of switches & LED 4009. A CPU interface unit 4008 controls data exchange with the DSP 3002. An internal bus (ASIC bus) 4010 connects the above-described units.

Figure 7:
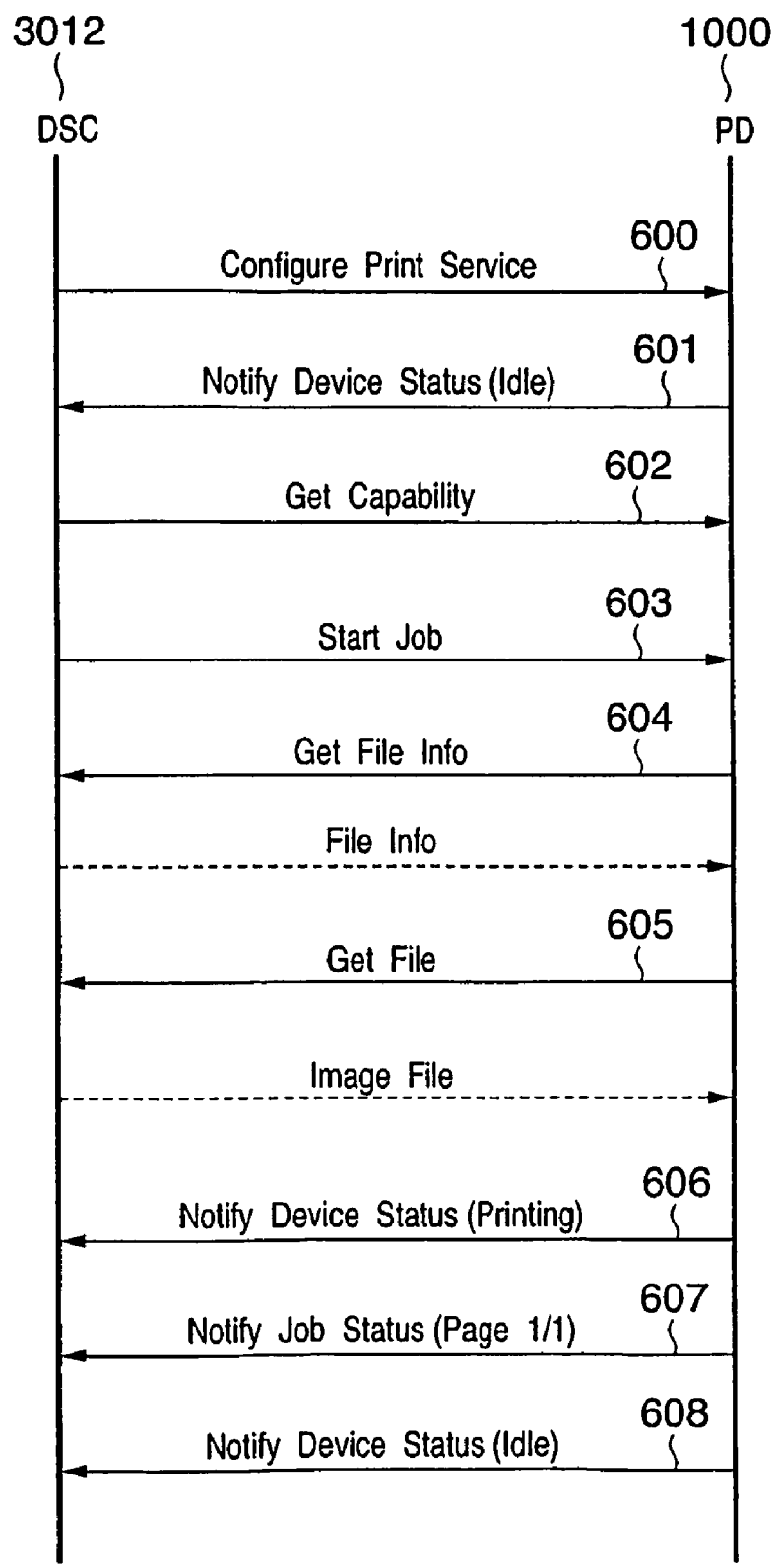
FIG. 7 depicts a view for explaining an approximate signal flow in a print system employing PictBridge when a print request is issued from the CP to the PD printer to execute print.

FIG. 7 depicts a view for explaining an approximate signal flow in the above-described print system when a print request is issued from the CP 3020 to the PD printer 1000 to execute print.

These processing procedures are executed after the PD printer 1000 and CP 3020 are connected via a USB cable, or it is confirmed by wireless communication that these devices are compliant to DPS conditions. First, the CP 3020 transmits "Configure Print Service" to the PD printer 1000 to check the status of the PD printer 1000 (600). The PD printer 1000 transmits its status at that time ("idle" status here) at that point of time (601). Since the PD printer is in the "idle" status, the CP 3020 inquires about the Capability of the PD printer 1000 (602) and obtains its Capability from the PD printer 1000. The CP 3020 issues a print start request (Start Job) corresponding to the Capability (603). The print start request is issued from the CP 3020 to the PD printer 1000 when "new Job OK" in the status information from the PD printer 1000 (to be described later) is "True" in 601.

In response to the print start request, the PD printer 1000 requests the information of the file from the CP 3020 on the basis of the file ID of print-instructed image data (GetFileInfo) (604). In response to this request, the CP 3020 transmits the information of the file (FileInfo). The information of the file contains, e.g., a file capacity. Upon receiving the information of the file and determining that the file is processable, the PD printer 1000 requests the file from the CP 3020 (GetFile) (605). The image data of the requested file is sent from the CP 3020 to the PD printer 1000. When the PD printer 1000 starts print processing, status information representing "progress of print (Printing)" is sent from the PD printer 1000 to the CP 3020 by "NotifyDeviceStatus" in 606. When print processing of one page is ended, the PD printer 1000 sends a print completion notification of one page by "NotifyJobStatus" at the start of processing of the next page (607). If the number of pages to be printed is one, the PD printer 1000 sends a notification indicating that it is in the "idle" status by "NotifyDeviceStatus" at the end of print of the requested page (NotifyDeviceStatus(Idle)) (608).

For example, in N-up print to lay out a plurality of (N) images on one page, "NotifyJobStatus" (607) is sent from the PD printer 1000 to the CP 3020 every time N images are printed. The issue timings of "NotifyJobStatus" and "NotifyDeviceStatus" and the image data obtaining order of this embodiment are merely examples, and various cases are possible depending on the specifications of products.

[First Embodiment]

Figure 8:
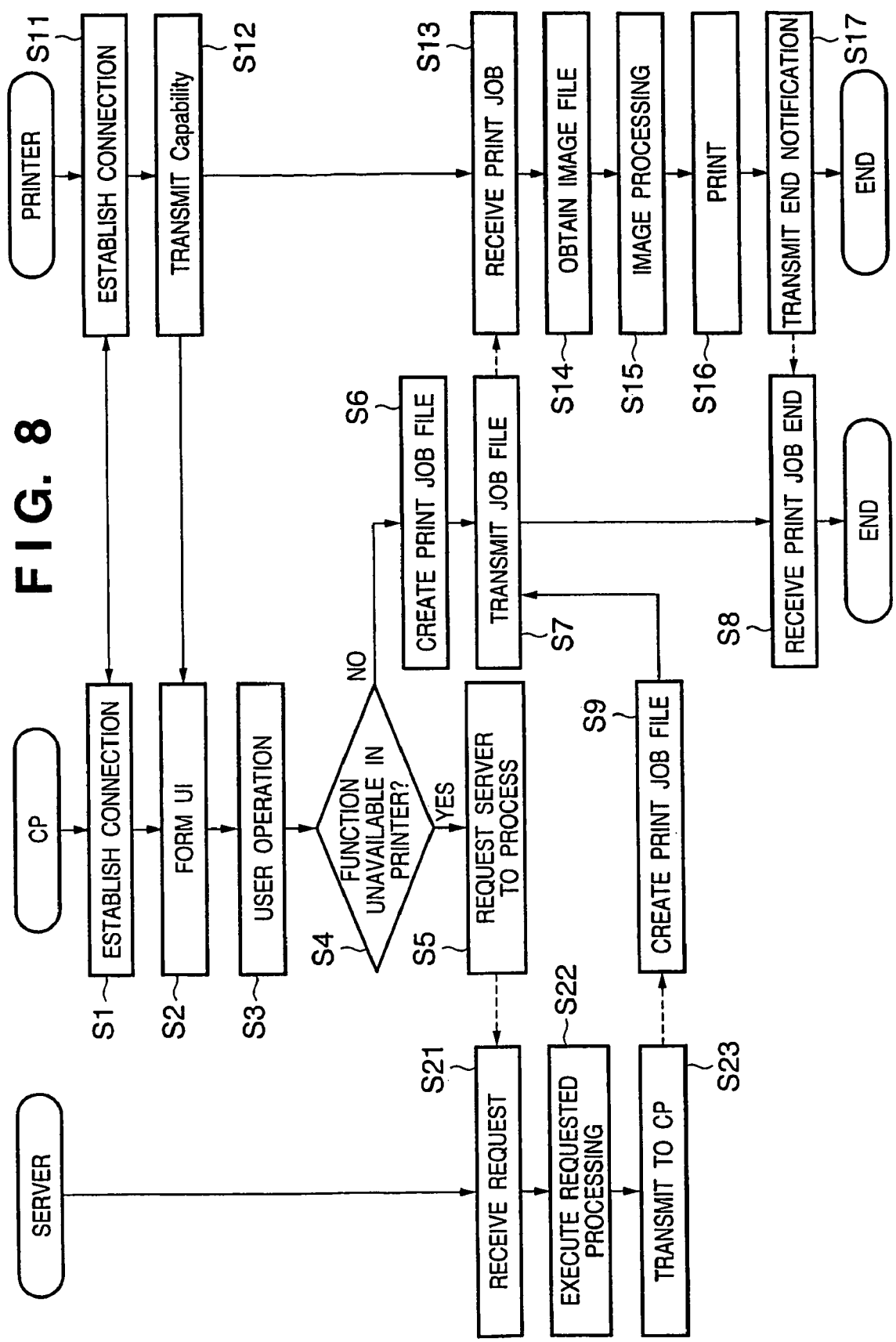
FIG. 8 is a flowchart for explaining a processing flow when communication is executed between a camera-equipped cellular phone (CP) and a PD printer according to the first embodiment of the present invention to supply image data from the CP to the PD printer and print the image data.

FIG. 8 is a flowchart for explaining a processing flow when communication is executed between a camera-equipped cellular phone (CP) 3020 and a PD printer 1000 according to the first embodiment of the present invention to supply image data from the CP 3020 to the PD printer 1000 and print the image data. Referring to FIG. 8, steps S1 to S9 indicate processing by the CP 3020. Steps S11 to S17 indicate processing by the PD printer 1000. Steps S21 to S23 indicate processing by a server 105.

In steps S1 and S11, the CP 3020 and PD printer 1000 mutually confirm that they are compliant to direct print conditions. At this time, the CP 3020 inquires of the PD printer 1000 about its status and device information. In response to this inquiry, the PD printer 1000 returns its status and device information at that point of time. The device information contains, e.g., the version of the connection protocol and the vender name and model name of the printer. The CP 3020 requests the Capability from the PD printer 1000, as indicated by 602 in FIG. 7.

In step S12, the PD printer 1000 creates capability information (Capability) about its print function and transmits the Capability to the CP 3020. The CP 3020 receives the Capability and generates and displays a UI on a display unit 35 in step S2. At this time, a UI capable of instructing even a print function unavailable in the PD printer 1000 is displayed.

Figure 9:
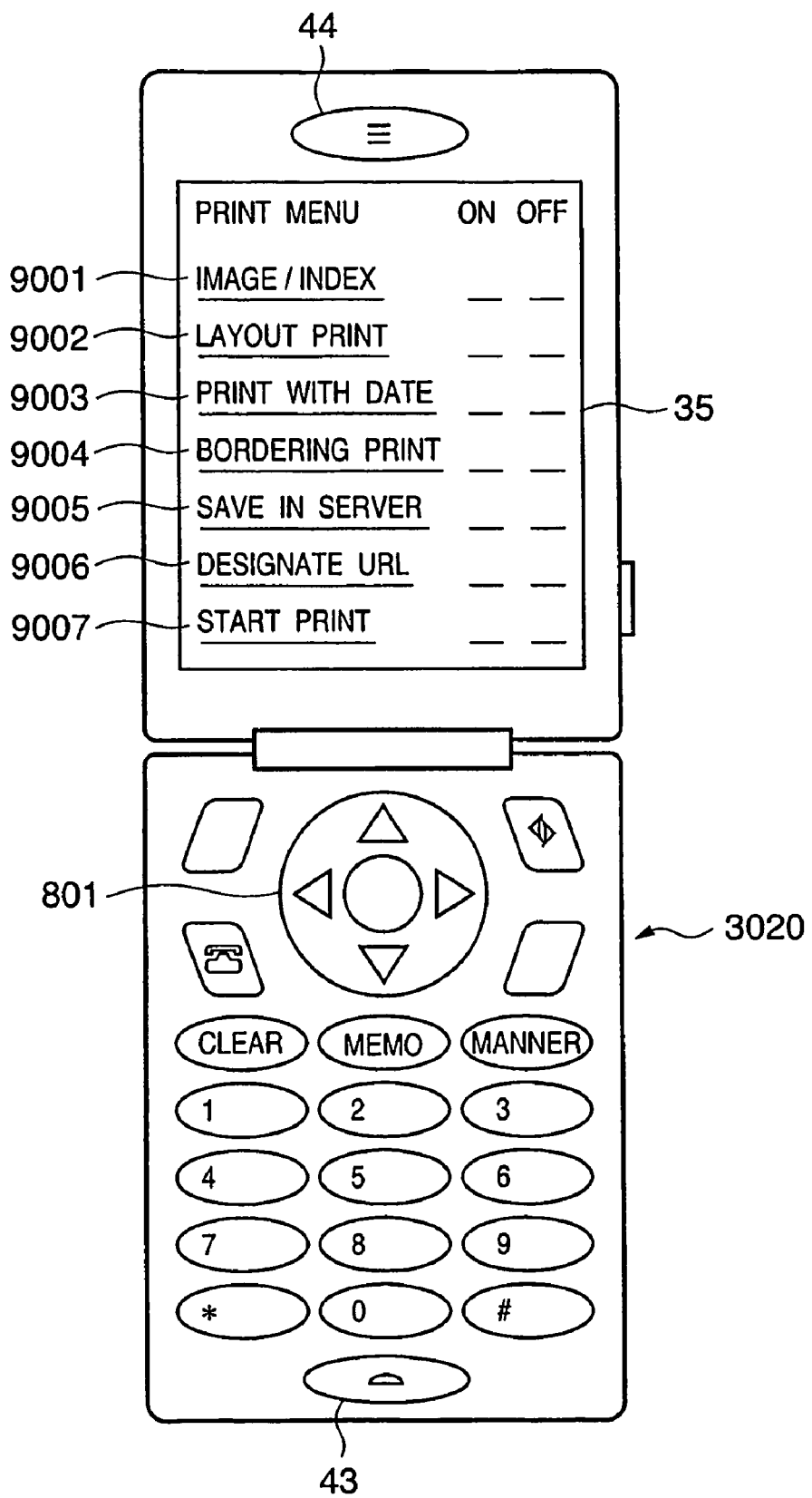
FIG. 9 depicts a view for explaining the UI of the CP according to the embodiment.

FIG. 9 depicts a view for explaining the UI of the CP 3020 according to the first embodiment. The same reference numerals as in FIG. 2 denote the same parts in FIG. 9. The CP 3020 is of a folding type. FIG. 9 shows a state wherein the CP 3020 is unfolded to make display on the display unit 35 visible.

Referring to FIG. 9, the display unit 35 displays a print menu. Each print item can be designated by selecting it by using cursor & select keys 801. For example, when "image/ index" print 9001 is selected, image print or index print can be designated. When image print is designated, images stored in a memory card 40 are displayed as indices. One or a plurality of images to be printed can be selected by the user and printed. "Layout print" 9002 is valid only in the image print mode in which a plurality of images are laid out and printed on one paper sheet. When the "layout print" is set to "ON", a window to set the number of images to be laid out is displayed. With "date print" 9003 and "bordering print" 9004, whether to print a date on an image and whether to print an image with a border (bordering print) are designated. "Save in server" 9005 is selected to temporarily store, in the server 105, an image file converted by the server 105 (this processing will be described later). "Designate URL" 9006 is selected to designate a URL at which an image file is stored by the server 105 and print the image. When "designate URL" 9006 is turned on, a window to input a URL is displayed, or several URL candidates registered in advance are displayed. "Start print" 9007 is selected to instruct the start of print.

In step S3, the user of the CP 3020 selects an image to be printed by referring to the formed UI window, sets the print format of the image, and instructs the start of print processing. In step S4, it is determined whether the print function set by using the UI includes a print function unavailable in the PD printer 1000. If NO in step S4, the flow advances to step S6 to create a print job file on the basis of a user's designation. In step S7, the print job file is transmitted to the PD printer 1000.

In step S13, the print job file is received by the PD printer 1000. Upon receiving the print job file, the PD printer 1000 analyzes the received print job file to prepare for print in step S14. An "image file information obtaining request" of the print target, which is described in the print job file, is issued to the CP 3020. On the basis of image file information transmitted from the CP 3020 in response to the request, the PD printer 1000 requests, from the CP 3020, the image file containing the image data to be actually printed and obtains the image file (step S14). Upon receiving the image file to be printed, the PD printer 1000 decodes the image data of the image file and executes image processing to convert the image data into an image of a format printable by the PD printer 1000 (step S15). In step S16, print is executed on the basis of the converted image data. When print of the image data of the image file is completed, in step S17, the PD printer 1000 notifies the CP 3020 that print of the image file is completed. Upon receiving the print end notification in step S8, the CP 3020 ends the processing.

If YES in step S4, the flow advances to step S5 to request the server 105 to process the image to satisfy the print function.

A detailed example will be described below.

In the CP 3020, image data to be printed is sensed by using the camera function prepared in the CP 3020, encoded to a predetermined format, and stored in the memory card 40 or a nonvolatile memory in the main body. In this embodiment, assume that the format of the stored image is the PNG format. The PNG format is an image format employing lossless encoding to ensure a high compression rate and is widely used recently.

Assume that the image format processable by the PD printer 1000 is defined as "EXIF" or "JPEG" in the Capability obtained from the PD printer 1000 in step S2 described above. In this case, even when image data of PNG format is transmitted from the CP 3020 to the PD printer 1000, the PD printer 1000 cannot decode or print the image data. Also assume that the CP 3020 itself has no image format conversion function because of constraints on the device. At this time, the CP 3020 can transmit the image data of PNG format to the server 105 through Internet 101 and requests the server 105 to convert the PNG format to the EXIF/JPEG format.

Upon receiving the request in step S21, the server 105 executes processing to convert the received image format to the designated image format (EXIF/JPEG format here) (step S22). The processed image file is transmitted to the CP 3020 (step S23).

The converted and transmitted image file is received by the CP 3020 in step S9. The CP 3020 creates a print job file on the basis of the image file. In step S7, the created print job file is transmitted to the PD printer 1000. From then, the same processing as in steps S8 and S13 to S17 described above is executed.

The server 105 of this embodiment needs to have a function of interpreting request information received from the CP 3020 and a function of decoding an image of PNG format and encoding it to an image of EXIF/JPEG format. In addition to the above-described format conversion function, the server 105 may also have another format conversion information and an encoding/decoding function to cope with, e.g., the XHTML format or GIFF format.

When the request from the CP 3020 is received in step S21, and the server 105 has no function corresponding to the request, the server 105 may notify the CP 3020 of it. In this case, the CP 3020 may change the UI to notify the user that print is impossible.

In the above-described embodiment, one image is transmitted from the CP 3020 to the PD printer 1000 and printed. However, the embodiment can also be applied to a print job which combines various kinds of print layout services such as multiple image print, image print in a form corresponding to another Capability, and image print based on DPOF.

As an example, N-up print will be described. Assume that two images are selected by using the UI of the CP 3020 in step S3 to execute 2-up print (to print two images on one paper sheet) although it is apparent in advance from the Capability of the PD printer 1000 that it has no 2-up print function.

In this case, since the PD printer 1000 does not have the print function, the server 105 is requested to execute image processing for 2-up print in step S5. The two selected EXIF/ JPEG image files to be printed are transmitted to the server 105 together with 2-up conversion information. Upon receiving the information in step S21, in step S22, the server 105 reduces the received EXIF/JPEG image data and lays out the two selected images on one paper sheet on the basis of layout information, thereby creating one new EXIF/JPEG image data for 2-up. In step S23, the created image file is transmitted to the CP 3020.

The CP 3020 creates a print job file on the basis of the received image file and transmits the print job file to the PD printer 1000 to print it, like normal single image print (FIG. 8).

As image conversion processing that the server 105 is asked to do, paper layout has been described as an example. In addition to it, the present invention can be applied to various image processes such as fixed size print, date print, file name print, and cropping print.

Figure 10:
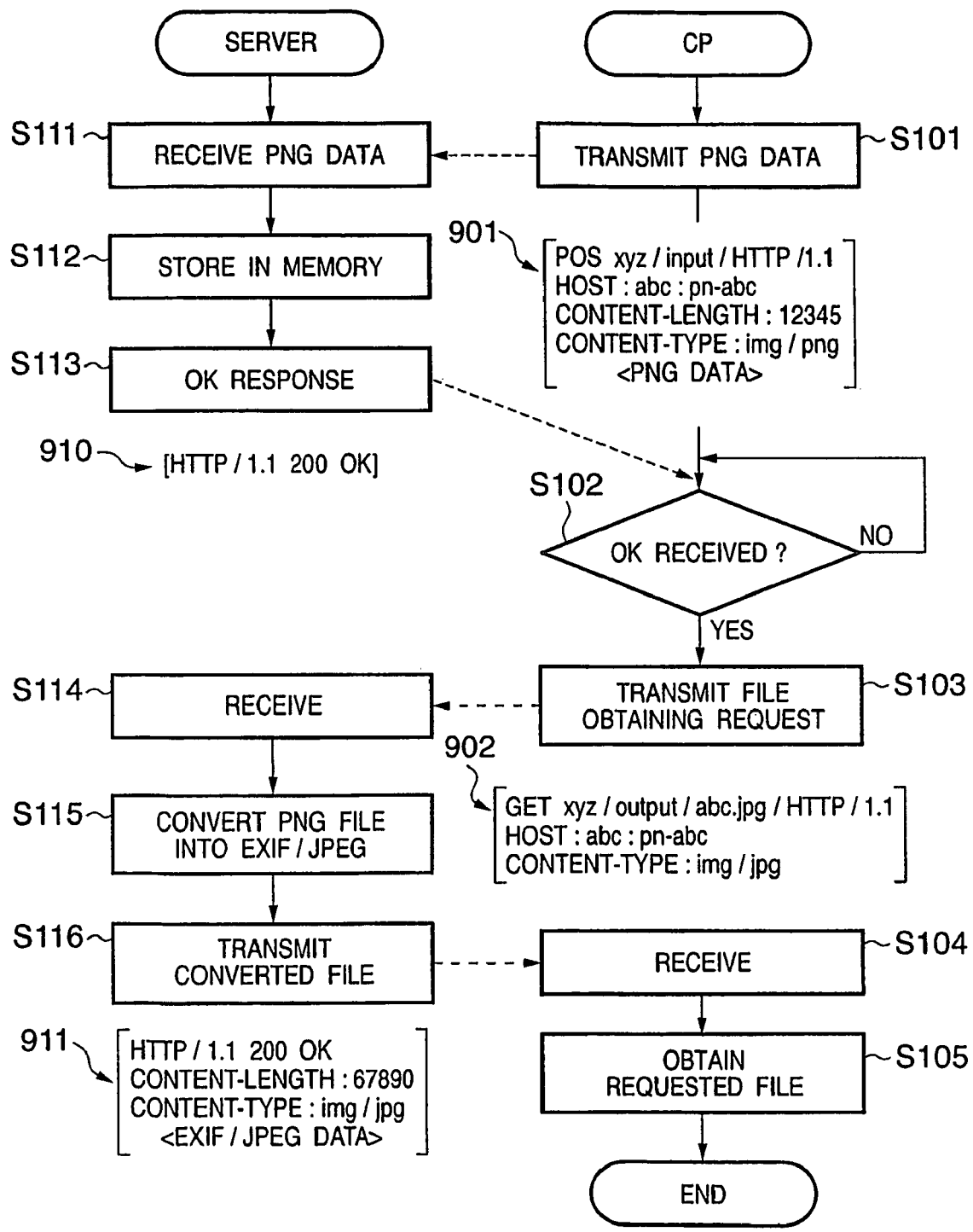
FIG. 10 is a flowchart for explaining data exchange between the CP and a server according to the first embodiment.

FIG. 10 is a flowchart for explaining data exchange between the CP 3020 and the server 105 according to the first embodiment. The CP 3020 and server 105 are TCP/IP-connected. As the communication protocols between the devices, HTTP generally used in a network is used.

In this embodiment, the service provided by the server 105 converts a PNG image file, which is sent from the client to a predetermined address of the server 105 by an HTTP POST method, into an EXIF/JPEG image file and supplies the converted EXIF/JPEG image file for an HTTP GET method executed by the client for the predetermined address on the side of the server 105. Assume that the CP 3020 has already obtained the IP address and service form of the server 105 by any existing mechanism (not shown).

In step S101, the CP 3020 transmits a PNG image file to be converted to the server 105 by using the HTTP POST method. Reference numeral 901 denotes an example of the HTTP POST request. A POST destination "xyz/input/" described on the first line indicates the "destination to which the service user should send the PNG image file", which is defined in the service provided by the server 105. In transmission source information "abc:pn-abc" of the second line, "abc" indicates the address of the client (CP 3020) as the transmission source, and "pn-abc" describes a port number to be used by the client as the transmission source in the HTTP POST method. In "CONTENT-LENGTH" of the third line, the data size of the PNG image file attached to the HTTP POST request is described. In "CONTENT-TYPE" of the fourth line, a character string "img/png" indicating the PNG image file is described. The PNG image file is attached as binary data from the line after next to "CONTENT-TYPE", i.e., from the sixth line from the top.

The server 105 receives the PNG image file in step S111 and holds it inside in step S112 (the file is held in "xyz/input/" here, though any other holding format and location can be used). In step S113, the server 105 notifies the CP 3020 that the HTTP POST request is normally processed. Reference numeral 910 denotes an example of an HTTP POST response in which "200 OK" described in the first line indicates normal termination.

When this normal response is received in step S102, the flow advances to step S103. The CP 3020 transmits, to the server 105, an obtaining request of the converted image file, i.e., the EXIF/JPEG image file converted from the PNG image file by using the HTTP GET method. Reference numeral 902 denotes an example of the HTTP GET request. The GET destination "xyz/output/abc.jpg" described on the first line indicates the "destination to be designated by the service user in requesting sending of an EXIF/JPEG image file", which is defined in the service provided by the server 105. The description of the second line is the same as in 901. In "CONTENT-TYPE" of the third line, a character string "img/jpg" indicating the converted JPEG image file is described. When this request is received by the server 105 in step S114, the flow advances to step S115 to convert the held PNG image file into an EXIF/JPEG image file. In step S116, the converted EXIF/JPEG image file is sent to the CP 3020 as an HTTP GET response. Reference numeral 911 denotes an example of the HTTP GET response in which "200 OK" described on the first line indicates normal termination. In "CONTENT-LENGTH" of the second line, the data size of the EXIF/JPEG image file attached to the HTTP GET response is described. In "CONTENT-TYPE" of the third line, a character string "img/jpg" indicating the EXIF/JPEG image file is described. The EXIF/JPEG image file is attached from the line after next to "CONTENT-TYPE", i.e., from the fifth line from the top.

The converted image data is received by the CP 3020 in step S104. In step S105, the received converted EXIF/JPEG image file is obtained.

Figure 11:
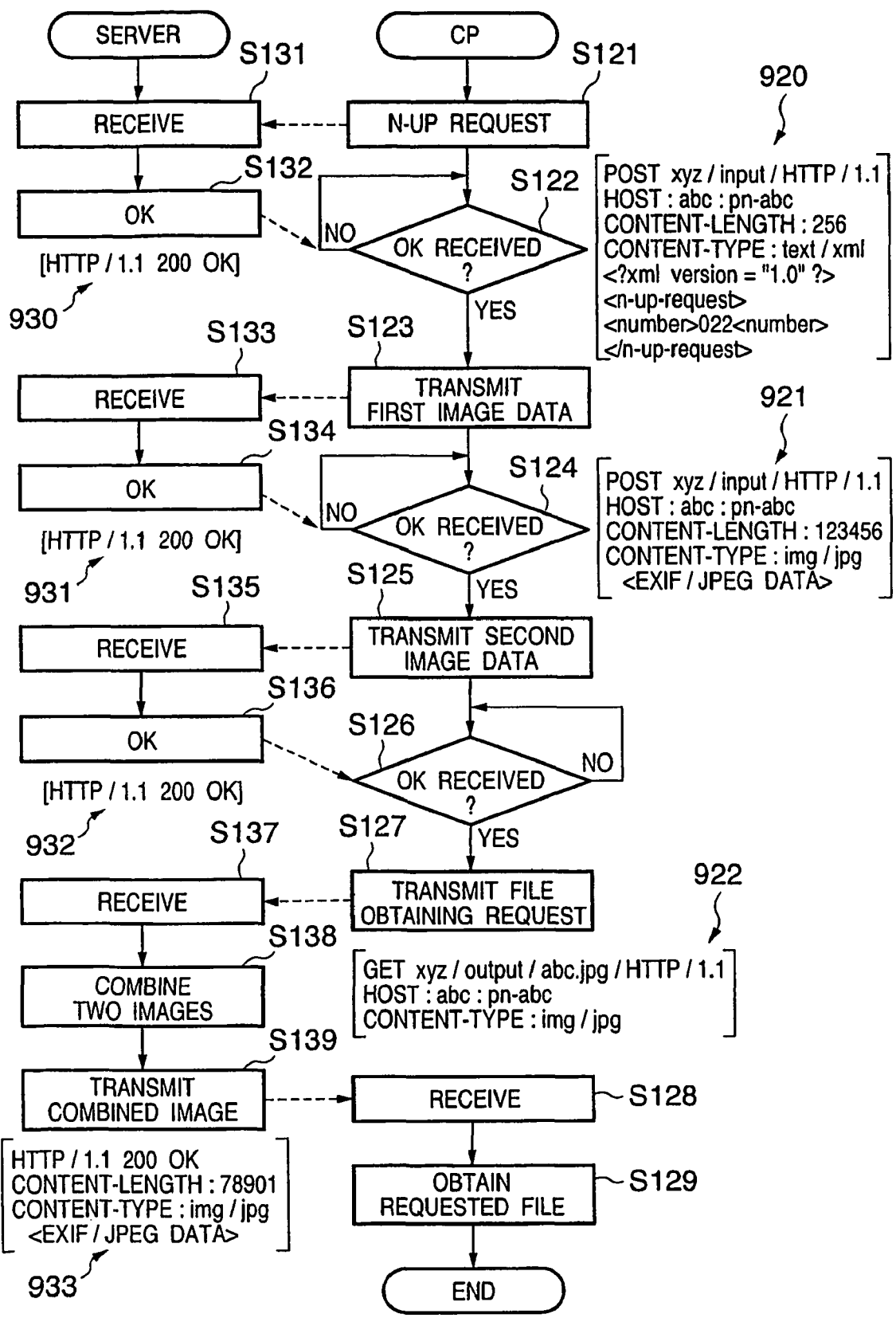
FIG. 11 is a flowchart for explaining data exchange between the CP and the server in another detailed example (N-up print) of the first embodiment.

FIG. 11 is a flowchart for explaining data exchange between the CP 3020 and the server 105 in another detailed example (N-up print) of the first embodiment.

In the first embodiment, the service provided by the server 105 combines one EXIF/JPEG image file from an N-up image combination request XML script, which is sent from a client to a predetermined address of the server 105 by the HTTP POST method, and EXIF/JPEG image files the number of which is described in the XML script. The combined EXIF/JPEG image file is supplied for an HTTP GET method executed by the client for the predetermined address on the server. Assume that the CP 3020 has already obtained the IP address and service form of the server 105 by any existing mechanism (not shown), as in FIG. 10 described above.

In step S121, the CP 3020 sends to the server 105 by using the HTTP POST method an XML script describing the number of EXIF/JPEG image files to be combined. Reference numeral 920 denotes an example of the HTTP POST request. The first and second lines are the same as in 901 in FIG. 10, and a description thereof will be omitted. In "CONTENT-LENGTH" of the third line, the size of the XML script which describes the number of files to be combined and is attached to the HTTP POST request is described. In "CONTENT-TYPE" of the fourth line, a character string "text/xml" indicating the XML script is described. The XML script which describes the number of files to be combined is described from the line after next to "CONTENT-TYPE", i.e., from the sixth line from the top. In addition, "n-up-request" of the seventh line indicates that the request is a combination request of a plurality of images, and "002" described in "number" of the eighth line indicates that the CP 3020 wants to combine two images.

The server 105 receives the N-up request in step S131 and notifies the CP 3020 in step S132 that the HTTP POST request is normally processed. Reference numeral 930 denotes an example of the HTTP POST response in which "200 OK" described in the first line indicates normal termination.

Upon receiving this response (step S122), the CP 3020 transmits the first EXIF/JPEG image file to be combined to the server 105 by using the HTTP POST method in step S123. Reference numeral 921 denotes an example of the HTTP POST request. The first and second lines are the same as in 901 in FIG. 10, and a description thereof will be omitted. In "CONTENT-LENGTH" of the third line, the data size of the first EXIF/JPEG image file to be combined, which is attached to the HTTP POST request, is described. In "CONTENT-TYPE" of the fourth line, a character string "img/jpg" indicating the EXIF/JPEG image file is described. The first EXIF/JPEG image file to be combined is attached from the line after next to "CONTENT-TYPE", i.e., from the sixth line from the top.

This image file is received by the server 105 in step S133. The server 105 holds the received first EXIF/JPEG image file (the file is held in "xyz/input/" here, though any other holding format and location can be used) and notifies the CP 3020 that the HTTP POST request is normally processed (step S134). Reference numeral 931 denotes an example of the HTTP POST response.

Upon receiving this response (step S124), the CP 3020 transmits the second EXIF/JPEG image file to be combined in step S125, as in step S123. In steps S135 and S136, the server 105 executes holding and response, as in steps S133 and S134.

In steps S121 to S126, the number of image files requested by the CP 3020 to be combined and the image files are transmitted. In step S127, the CP 3020 transmits an obtaining request of the combined EXIF/JPEG image file by using the HTTP GET method. Reference numeral 922 denotes an example of the HTTP GET request. The GET destination "xyz/output/abc.jpg" described on the first line indicates the "destination to be designated by the service user in requesting sending of a combined EXIF/JPEG image file", which is defined in the service provided by the server 105. The description of the second line is the same as in 902 in FIG. 10. In "CONTENT-TYPE" of the third line, a character string "img/jpg" indicating the EXIF/JPEG image file is described.

Upon receiving this request in step S137, the server 105 combines the two held EXIF/JPEG image files into one EXIF/JPEG image file (step S138). In step S139, the combined EXIF/JPEG image file is sent to the CP 3020 as an HTTP GET response. Reference numeral 933 denotes an example of the HTTP GET response in which "200 OK" described on the first line indicates normal termination. In "CONTENT-LENGTH" of the second line, the data size of the EXIF/JPEG image file attached to the HTTP GET response is described. In "CONTENT-TYPE" of the third line, a character string "img/jpg" indicating the EXIF/JPEG image file is described. The EXIF/JPEG image file is attached from the line after next to "CONTENT-TYPE", i.e., from the fifth line from the top.

The CP 3020 receives this image file in step S128 and obtains the received combined EXIF/JPEG image file in step S129.

As described above, in the first embodiment, HTTP is used as the communication protocol, and the HTTP POST method and HTTP GET method are used. However, the two methods need not always be used. HTTP PUT may be used, and any other protocol may be used.

In the service provided by the server 105 of the first embodiment, a PNG image file POSTed from the client to a predetermined address of the server 105 is converted. Instead, the PNG image file to be converted may be specified by any other method of, e.g., requesting the PNG image file by description in a script POSTed from the client.

In the service provided by the server 105 of the first embodiment, when GET is done from the client to a predetermined address of the server 105, the EXIF/JPEG image file is converted and sent. Instead, the image file to be converted may be requested by any other method of, e.g., requesting the image file by description in a script POSTed from the client. Image conversion can be executed any time and may be executed before the converted image sending request is issued from the client. Alternatively, the EXIF/JPEG image files to be combined, the number of images to be combined, and the combination method may be specified by any other method of, e.g., simply determining the number of images to be combined and the combination method on the basis of the number of times of POST of EXIF/JPEG image files executed before the HTTP GET request is sent from the client.

Figure 16:
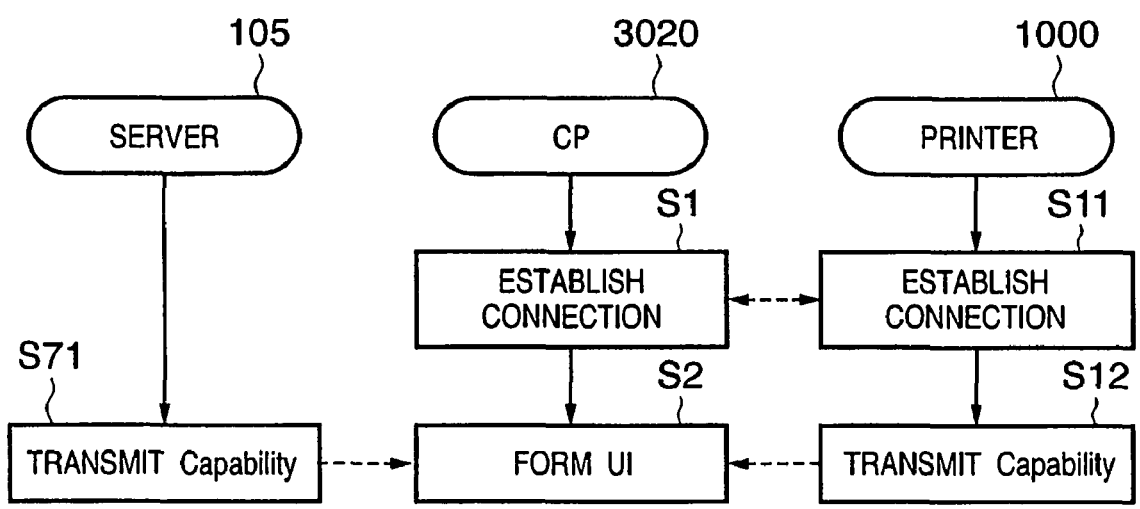
FIG. 16 is a flowchart for explaining a processing flow when communication is executed between a camera-equipped cellular phone (CP), the PD printer, and the server according to the first embodiment of the present invention to form a UI in the CP.

FIG. 16 is a flowchart for explaining a processing flow when communication is executed between the camera-equipped cellular phone (CP) 3020, the PD printer 1000, and the server 105 according to the first embodiment of the present invention to form a UI in the CP 3020. Referring to FIG. 16, steps S1 and S2 indicate processing by the CP 3020. Steps S11 and S12 indicate processing by the PD printer 1000. Step S71 indicates processing by the server 105. Steps S1 and S11 are the same as in FIG. 8, and a description thereof will be omitted.

The CP 3020 requests the Capability from the PD printer 1000, as indicated by 602 in FIG. 7. In step S12, the PD printer 1000 creates capability information (Capability1) about its print function and transmits the Capability1 to the CP 3020. The CP 3020 receives the Capability1. The CP 3020 also requests the Capability from the server 105. In step S71, the server 105 creates capability information (Capability2) about its service function and transmits the Capability2 to the CP 3020. The CP 3020 receives the Capability2.

In step S2, the CP 3020 forms an UI by using the received Capability1 of the PD printer 1000 and Capability2 of the server 105 and displays the UI on the display unit 35. In this case, it is not always guaranteed that the service function Capability2 of the server 105 is superior to the print function Capability1 of the PD printer 1000. Hence, the CP 3020 may compare the Capability1 and Capability2 and form a UI on the basis of Capability determined as a higher function. Alternatively, the CP 3020 may create Capability3 by combining superior parts of the Capability1 and Capability2 and form a UI on the basis of the Capability3. As a result, a UI capable of instructing even a print function unavailable in the PD printer 1000 can be displayed.

As the method of causing the CP 3020 to request the Capability from the server 105, any method can be used. An existing standard method (e.g., UPnP) may be used, or scripts based on original rules may be exchanged by using the HTTP method.

[Second Embodiment]

The second embodiment of the present invention will be described next. In the above-described first embodiment, when the CP 3020 requests image processing from the server 105, and for example, the amount of image data is so enormous that the processing time in the server 105 becomes long, communication timeout may occur in print processing between the CP 3020 and the PD printer 1000. In this case, in the second embodiment, image data converted in a server 105 is temporarily stored in a database 105a (FIG. 1) provided in the server 105. The server 105 notifies a CP 3020 of only a URL indicating the storage address.

Upon receiving the address, the CP 3020 forms a UI capable of designating the URL and instructing print and displays the UI on a display unit 35 (FIG. 9). When the user designates the URL by using the UI and instructs a PD printer 1000 to print, the CP 3020 reads out corresponding image data from the database 105a on the basis of the URL. The image data is transmitted to the PD printer 1000 and printed. The arrangement of a print system and the hardware configurations of the CP 3020 and PD printer 1000 according to the second embodiment are the same as in the above-described first embodiment, and a description thereof will be omitted.

Figure 12:
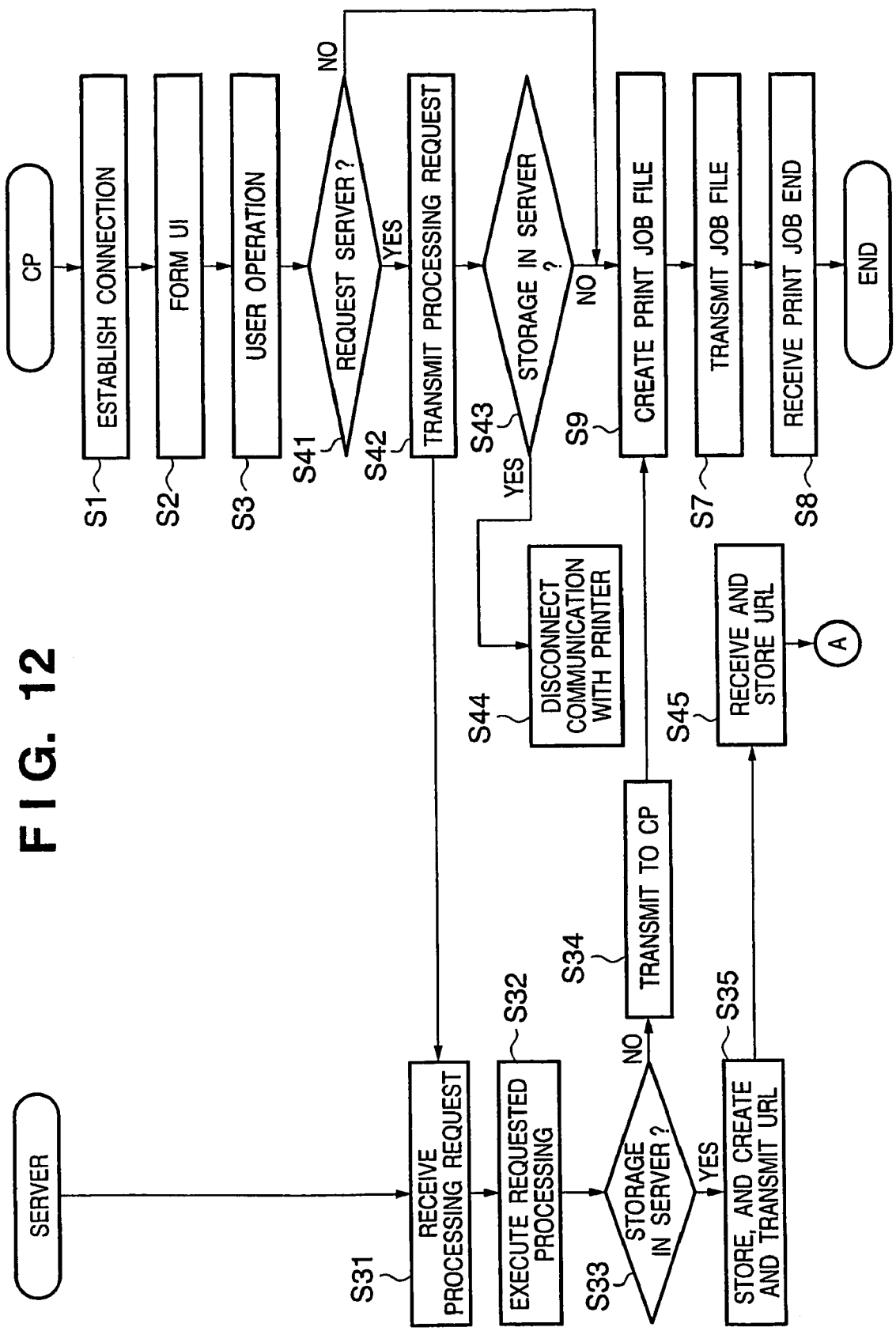
FIGS. 12 and 13 are flowcharts for explaining a processing flow when communication is executed between a camera-equipped cellular phone (CP) and a PD printer according to the second embodiment of the present invention to supply image data from the CP to the PD printer and print the image data.
Figure 13:
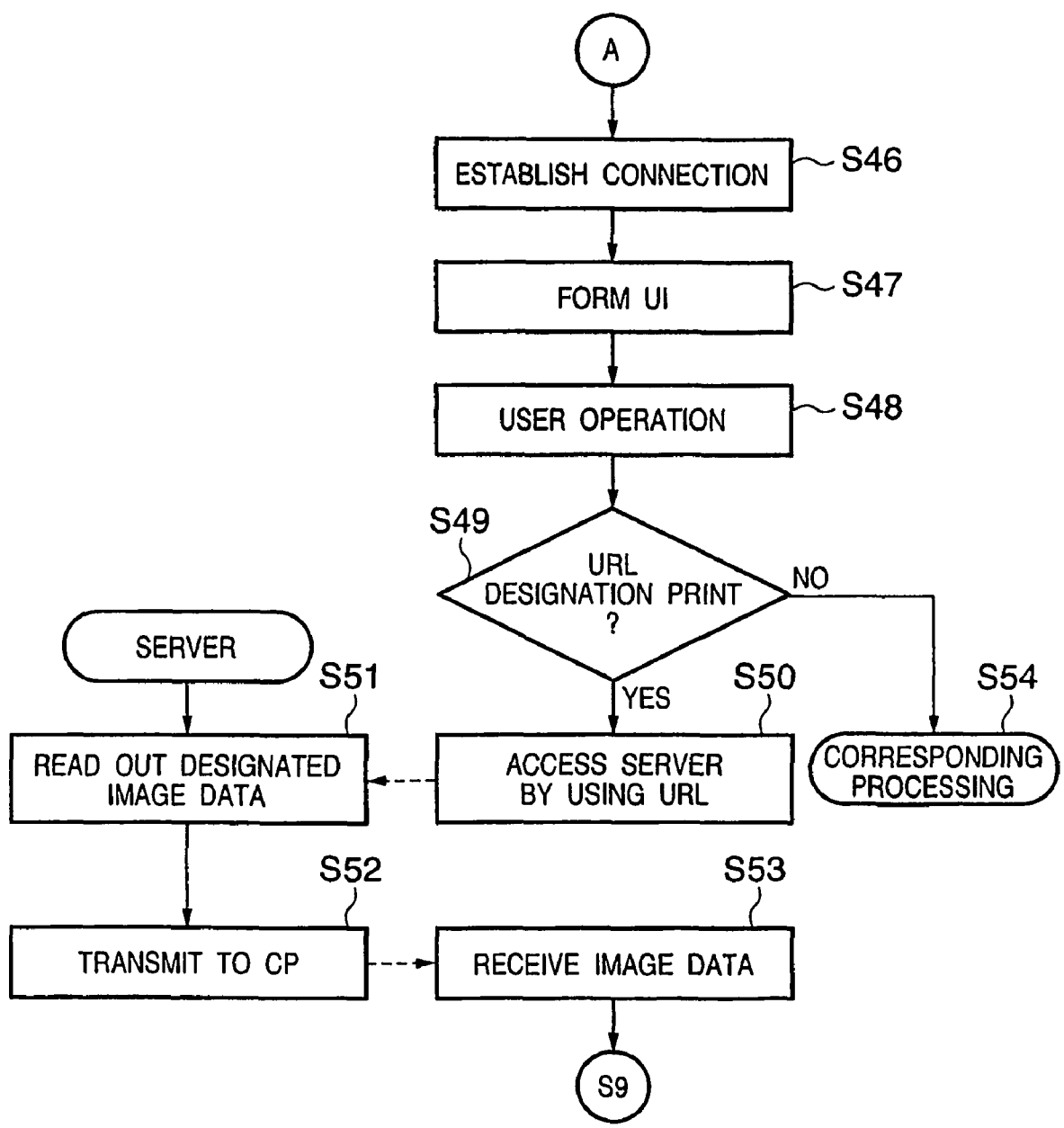

FIGS. 12 and 13 are flowcharts for explaining processing flows when communication is executed between the camera-equipped cellular phone (CP) 3020 and the PD printer 1000 according to the second embodiment of the present invention to supply image data from the CP 3020 to the PD printer 1000 and print the image data. The same step numbers as in FIG. 8 denote the same processing steps in the flowchart of FIG. 12, and a description thereof will be omitted.

In step S3, the user designates print by using the UI of the CP 3020. Assume here that the image format to be printed is, e.g., a PNG format, and the PD printer 1000 does not cope with this image format. In this case, it is determined in step S41 that image conversion processing by the server 105 is necessary, and the flow advances to step S42. In step S42, the CP 3020 requests the server 105 to convert the PNG format into the EXIF/JPEG format. In addition, if it is determined that the conversion processing takes a long time because the amount of the image data to be format-converted is large, the CP 3020 instructs to store the converted image data in the server 105. In step S43, it is determined whether the instruction to store the image data in the server 105 is issued. If YES in step S43, the flow advances to step S44 to disconnect communication with the PD printer 1000.

Whether to store image data in the server 105 can be not only determined on the basis of the data amount but also designated by the user by using the UI, as described with reference to the UI window shown in FIG. 9.

Processing in the server 105 will be described next. The server 105 receives the processing request from the CP 3020 in step S31 and executes the requested processing in step S32. In step S32, for example, the image data is converted into the EXIF/JPEG format on the basis of the conversion information of the PNG data received from the CP 3020. In step S33, the conversion information received in step S31 contains the instruction to store the converted image file in the database 105a. If YES in step S33, the flow advances to step S35 to store the converted image data in the database 105a, create a URL representing the storage address, and transmit the URL to the CP 3020. The URL is received by the CP 3020 and stored in a RAM 33 in step S45.

If NO in step S33, the flow advances to step S34 to transmit the processed image data to the CP 3020, like the above-described processing shown in FIG. 8. The image data is received by the CP 3020 in step S9, and a print job is created.

Upon receiving the URL in step S45, the CP 3020 establishes communication connection with the PD printer 1000 again in step S46 (FIG. 13). In step S47, a UI capable of designating a print image by the URL is formed and displayed on the display unit 35. Hence, the user can designate print by using the URL in the UI of the CP 3020. When the URL is designated, and a print instruction is input by the user's operation in step S48, the flow advances from step S49 to step S50 to access the server 105 through Internet 101 on the basis of the URL.

The server 105 reads out the image data designated by the URL from the database 105a in step S51 and transmits the image data to the CP 3020 in step S52.

In step S53, the CP 3020 downloads the image file to be printed. The flow advances to step S9 (FIG. 8) to create the print job to be transmitted to the PD printer 1000 and transmit the print job to the PD printer 1000. If it is determined that the designation is no print designation using a URL, the flow advances to step S54 to execute processing corresponding to the instruction.

As described above, according to the second embodiment, when it is expected that the processing time in the server 105 becomes long, and timeout in the communication occurs between the CP 3020 and the PD printer 1000, the processed image data is temporarily stored in the server 105, and the URL representing the storage address is received. The UI capable of designating the image file is formed and displayed by using the URL in the CP 3020. With this processing, selection of the image to be printed and print instruction can be done by using the UI in the CP 3020.

Figure 14:
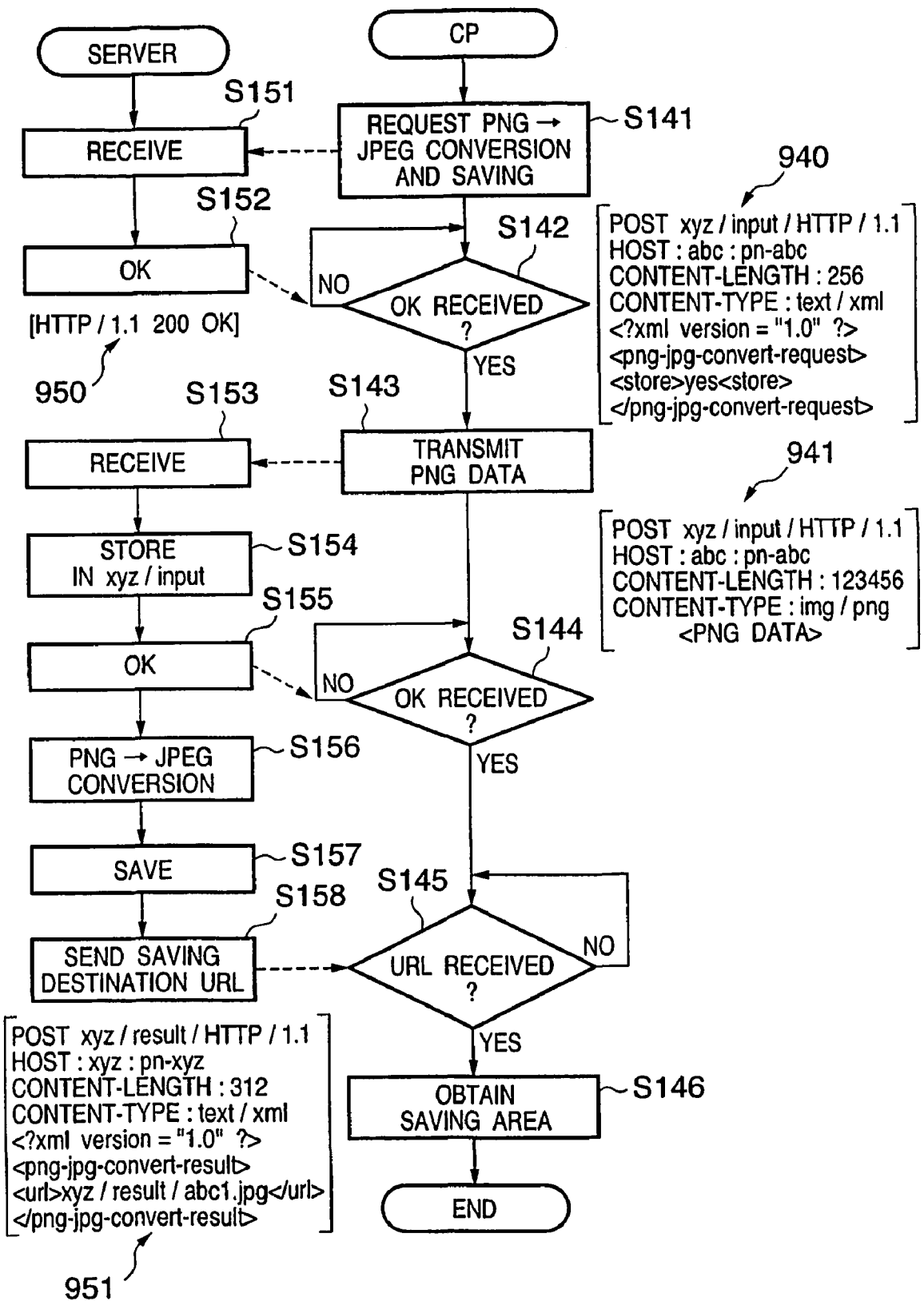
FIG. 14 is a flowchart for explaining data exchange between the CP and a server according to the second embodiment of the present invention.

FIG. 14 is a flowchart for explaining data exchange between the CP 3020 and the server 105 according to the second embodiment of the present invention. Referring to FIG. 14, the CP 3020 and server 105 are connected in the same way as in the above-described first embodiment.

In the second embodiment, the service provided by the server 105 includes image conversion from PNG which is sent from the client to a predetermined address of the server 105 by using an HTTP POST method into JPEG, converted image data saving processing based on a saving request XML script, and conversion from a PNG image file into an EXIF/JPEG image file and saving processing of the image file. The service also includes processing of supplying an XML script for describing a location in which the converted image data has been stored from the server 105 to a predetermined address on the client by using the HTTP POST method. Assume that the CP 3020 has already obtained the IP address and service form of the server 105 by any existing mechanism, as in the above-described first embodiment.

In step S141, the CP 3020 sends, to the server 105, an XML script which describes a desire to convert a PNG image file into an EXIF/JPEG image file and save the image file by using the HTTP POST method. Reference numeral 940 denotes an example of the HTTP POST request. The first and second lines are the same as in 901 in FIG. 10, and a description thereof will be omitted. In "CONTENT-LENGTH" of the third line, the size of the XML script which describes the desire to convert a PNG image file into an EXIF/JPEG image file and save the image file, which is attached to the HTTP POST request, is described. In "CONTENT-TYPE" of the fourth line, a character string "text/xml" indicating the XML script is described. The XML script which describes the desire of conversion and saving is described from the line after next to "CONTENT-TYPE", i.e., from the sixth line from the top. In addition, "png-jpg-convert-request" of the seventh line indicates that the request is a conversion request from a PNG image file into an EXIF/JPEG image file, and "yes" described in "store" of the eighth line indicates that the CP 3020 wants saving in the server 105.

Upon receiving the XML script in step S151, the server 105 understands in step S152 that the request from the CP 3020 is conversion from a PNG image file into an EXIF/JPEG image file and saving of the image file and notifies the CP 3020 that the HTTP POST request is normally processed. Reference numeral 950 denotes an example of an HTTP POST response which is the same as the above-described OK response.

When the CP 3020 receives the OK response (step S142), the flow advances to step S143 to transmit the PNG image file to be converted and saved to the server 105 by using the HTTP POST method. Reference numeral 941 denotes contents of the HTTP POST request which is the same as in 902 in FIG. 10, and a description thereof will be omitted.

The server 105 receives the PNG data in step S153 and holds the received PNG image file inside in step S154 (the file is held in "xyz/input/" here, though any other holding format and location can be used). The server 105 notifies the CP 3020 that the HTTP POST request is normally processed (step S155). The example of the HTTP POST response is the same as described above. In step S156, the server 105 converts the held PNG image file into an EXIF/JPEG image file. In step S157, the server 105 saves the converted EXIF/JPEG image file at a predetermined location so as to be accessible from the CP 3020 (the file is held in "xyz/result/" with a file name "abc1/jpg" here. This is because conversion and management of the saved file are done on the basis of the first request from a client name "abc", though any other holding format, location, and management method can be used). In step S158, the server 105 sends an XML script which describes the saving location of the EXIF/JPEG image file to the CP 3020 by using the HTTP POST method. Reference numeral 951 denotes an example of the HTTP request. The POST destination "xyz/result/" described on the first line indicates "the destination of client to be designated to receive an XML script which describes the saving location of an EXIF/JPEG image file saved in the server", which is defined in the service provided by the server 105. Contents described in the transmission source information "xyz:pn-xyz" of the second line will be described. The address of the print job file as the transmission source is described in "xyz", and a port number to be used by the server 105 as the transmission source in the HTTP POST method is described in "pn-xyz". In "CONTENT-LENGTH" of the third line, the size of the XML script which describes the saving location of the EXIF/JPEG image file is described. In "CONTENT-TYPE" of the fourth line, a character string indicating the XML script is described. The XML script which describes the saving location of the EXIF/JPEG image file is described from the line after next to "CONTENT-TYPE", i.e., from the sixth line from the top. In addition, "png-jpg-convert-result" of the seventh line indicates that the result is a result of the conversion request, and "xyz/result.abc1.jpg" described in "url" of the eighth line indicates the saving location of the converted image data.

Upon receiving the URL in step S145, the CP 3020 obtains the saving location of the EXIF/JPEG image file converted and saved in the server 105 and notifies the server 105 that the HTTP POST request is normally processed in step S146.

From then, the CP 3020 can obtain the image saved in the server 105 by using an HTTP GET method.

In the second embodiment, HTTP is used as the communication protocol, and the HTTP POST method and HTTP GET method are used. However, the two methods need not always be used. HTTP PUT may be used, and any other protocol may be used.

In the service provided by the server 105 of the second embodiment, a PNG image file is converted into an EXIF/JPEG image file and saved on the basis of a description in an XML script POSTed to a predetermined address, and the CP is notified of the saving location. However, the present invention is not limited to this. The EXIF/JPEG image file to be saved and the saving method may be specified by any other method of, e.g., simply converting a PNG image file received from the CP 3020, saving the image file, and notifying the CP 3020 of the saving location.

In the service provided by the server 105 of the second embodiment, the saving location is POSTed to a predetermined address on the client. Instead, the CP 3020 may be notified of the saving location of the converted image file by any other method of, e.g., determining the saving location on the basis of a description in a script POSTed from the CP 3020 or notifying the CP 3020 of the saving location as a response to GET executed from the CP 3020 to a predetermined address of the server 105. Image conversion and saving can be executed any time and may be executed after the image sending request is issued from the CP 3020 to the saving location.

[Third Embodiment]

In the first embodiment, when the PNG format can be converted into the EXIF/JPEG format by using the resources of the RAM and ROM of the CP 3020, it may be determined on the basis of the amount of image data whether the target image needs to be manipulated and converted by the server. That is, even when the CP 3020 can manipulate and convert image data, processing of image data with a large size may be impossible from the viewpoint of the resources. As a characteristic feature of this embodiment, a criterion for such a case is defined.

Figure 15:
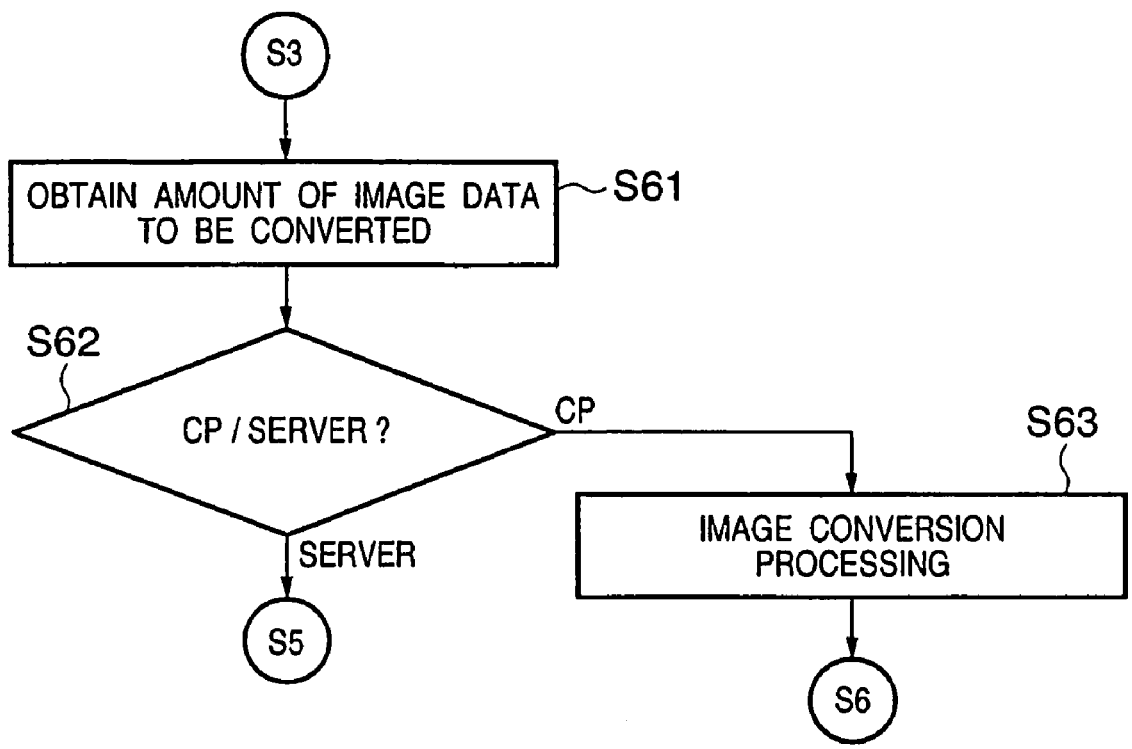
FIG. 15 is a flowchart for explaining processing according to the third embodiment of the present invention.

FIG. 15 is a flowchart for explaining processing according to the third embodiment of the present invention. This flowchart is added to the above-described processing flowchart shown in FIG. 8.

When an instruction to convert an image of the PNG format into an image of the JPEG format and print the image is input by the UI operation in step S3 in FIG. 8 described above, the flow advances to step S61 to obtain the amount of the image data of the PNG format. In step S62, it is determined whether the amount of image data is equal to or larger than a predetermined amount. If YES in step S62, it is determined that processing by a server 105 is appropriate, and the flow advances to step S5 to request the server 105 to execute image format conversion processing. If NO in step S62, it is determined that format conversion processing by a CP 3020 is possible, and the flow advances to step S63 to execute image conversion processing from the PNG format into the JPEG format. The flow advances to step S6 to create a print job. In step S7, the print job is transmitted from the CP 3020 to the PD printer 1000, and print processing based on the print job is instructed by the CP 3020.

As described above, according to this embodiment, when the server 105 is caused to execute image processing in the PD printer 1000 or CP 3020, even an image format which is not compatible with the PD printer can be printed. Hence, the application range of the image format which can be handled by the CP 3020 as an image to be printed can be widened.

According to this embodiment, when print is requested for a print function incompatible with the printer, manipulation and conversion are executed by the server so that a variety of image forms can be provided.

Further, according to this embodiment, a print image can be saved in the server, and a target image can be downloaded from the server to the CP and printed using a printer.

[Other Embodiment]

The object of the present invention is achieved even by supplying a storage medium which records software program codes to implement the functions of the above-described embodiments to a system or apparatus and causing the computer (or CPU or MPU) of the system or apparatus to read out and execute the program codes stored in the storage medium, as described above. In this case, the program codes read out from the storage medium implement the functions of the above-described embodiments by themselves, and the storage medium which stores the program codes constitutes the present invention. As the storage medium to supply the program codes, for example, a floppy (registered trademark) disk, hard disk, optical disk, magnetooptical disk, CD-ROM, CD-R, magnetic tape, nonvolatile memory card, or ROM can be used.

The functions of the above-described embodiments are implemented not only when the readout program codes are executed by the computer but also when the OS (Operating System) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The present invention is not limited to the above embodiment, and various changes and modifications can be made thereto within the spirit and scope of the present invention. Therefore, to apprise the public of the scope of the present invention, the following claims are made.

Claim of Priority

This application claims priority from Japanese Patent Application No. 2004-249020 filed on Aug. 27, 2004, the entire contents of which are hereby incorporated by reference herein.

The invention claimed is:

1. A print system for causing a printer to print an image on the basis of image data supplied from a portable communication apparatus by direct communication between the portable communication apparatus and the printer, the portable communication apparatus comprising:
- an obtaining unit that obtains information of a print function of the printer by means of the direct communication with the printer;
- an input unit that inputs a print condition for printing image data stored in the portable communication apparatus;
- a determination unit that determines, based on the information, whether or not the printer is able to print the image data in accordance with the print condition input by the input unit;
- a request unit that, in a case where the determination unit determines that the printer is not able to print the image data in accordance with the print condition input by the input unit, requests a server to execute corresponding image processing of the image data; and
- a print control unit that:
- (i) generates a job corresponding to the print condition input by the input unit and sends the job to the printer, in a case where the determination unit determines that the printer is able to print the image data in accordance with the print condition input by the input unit, and
- (ii) receives image data to which the corresponding image processing has been subjected by the server in accordance with a request by the request unit, generates a job for printing the received image data, and sends the generated job to the printer, in a case where the determination unit determines that the printer is not able to print the image data in accordance with the print condition input by the input unit
- wherein in a case that the print condition indicates a layout printing of a plurality of images, and in a case where the determination unit determines that the printer is not able to print the image data in accordance with the print condition input by the input unit, the server generates image data for printing an image in which the plurality of images are laid out in accordance with the print condition.

2. The print system according to claim 1, wherein the print condition includes image format conversion.

3. The print system according to claim 1, wherein the print condition includes layout print.

4. The print system according to claim 1, wherein the server is connected to a communication network, the server further comprising:
- a conversion unit that converts image data received from the portable communication apparatus through the communication network in accordance with the print condition; and
- a transmission unit that transmits the image data converted by the conversion unit to the portable communication apparatus through the communication network.

5. The print system according to claim 1, wherein the portable communication apparatus further comprises:
- an instruction unit that instructs to store, in the server, the image data processed by the server, and
- a reception unit that receives, from the server, a URL of the image data stored in the server.

6. The print system according to claim 1, wherein the portable communication apparatus further comprises:
- a second obtaining unit that obtains a processing function of the server, and
- a setting unit that sets print conditions inputtable by the input unit on the basis of the information of the print function of the printer and the processing function of the server obtained by the second obtaining unit.

7. The print system according to claim 6, wherein the setting unit sets the print conditions by selecting one of the processing function of the server and the print function of the printer.

8. The print system according to claim 6, wherein the setting unit sets the print conditions by combining the processing function of the server and the print function of the printer.

9. A portable communication apparatus for supplying image data to a printer and causing the printer to print the image data by a direct communication with the printer, comprising:
- an obtaining unit that obtains information of a print function of the printer by means of the direct communication with the printer;
- an input unit that inputs a print condition for printing image data stored in the portable communication apparatus;
- a determination unit that determines, based on the information, whether or not the printer is able to print the image data in accordance with the print condition input by the input unit;
- a request unit that, in a case where the determination unit determines that the printer is not able to print the image data in accordance with the print condition input by the input unit, requests a server to execute corresponding image processing of the image data, through a communication network; and
- a print control unit that:
- (i) generates a job corresponding to the print condition input by the input unit and sends the job to the printer, in a case where the determination unit determines that the printer is able to print the image data in accordance with the print condition input by the input unit, and
- (ii) receives image data to which the corresponding image processing has been subjected by the server in accordance with a request by the request unit, generates a job for printing the received image data, and sends the generated job to the printer, in a case where the determination unit determines that the printer is not able to print the image data in accordance with the print condition input by the input unit,.
- wherein in a case that the print condition indicates a layout printing of a plurality of images, and in a case where the determination unit determines that the printer is not able to print the image data in accordance with the print condition input by the input unit, the server generates image data for printing an image in which the plurality of images are laid out in accordance with the print condition.

10. The apparatus according to claim 9, wherein the print condition includes image format conversion.

11. The apparatus according to claim 9, wherein the print condition includes layout print.

12. The apparatus according to claim 9, further comprising an instruction unit that instructs the server to store the processed image data.

13. The apparatus according to claim 12, further comprising:
- a reception unit that receives a URL from the server,
- an obtaining unit that obtains the image data to be printed by the printer by using the URL received by the reception unit.

14. The apparatus according to claim 9, further comprising:
- a second obtaining unit that obtains a processing function of the server, and a setting unit that sets print conditions inputtable by the input unit on the basis of the information of the print function of the printer and the processing function of the server obtained by the second obtaining unit.

15. The apparatus according to claim 14, wherein the setting unit sets the print conditions by selecting one of the processing function of the server and the print function of the printer.

16. The apparatus according to claim 14, wherein the setting unit sets the print conditions by combining the processing function of the server and the print function of the printer.

17. A print control method of causing a printer to print an image on the basis of image data supplied from a portable communication apparatus by a direct communication between the portable communication apparatus and the printer, comprising:
    an obtaining step of obtaining information of a print function of the printer by means of the direct communication with the printer;
    an input step of inputting a print condition for printing image data stored in the portable communication apparatus;
    a determination step of determining based on the information whether or not the printer is able to print the image data in accordance with the print condition input in the input step;
    a request step of, in a case where it is determined in the determination step that the printer is not able to print the image data in accordance with the print condition input in the input step, causing the portable communication apparatus to request a server to execute corresponding image processing of the image data; and
    a print control step of:
    (i) generating a job corresponding to the print condition input in the input step and sending the job to the printer, in a case where it is determined in the determination step that the printer is able to print the image data in accordance with the print condition input in the input step, and
    (ii) receiving image data to which the corresponding image processing has been subjected by the server in accordance with a request by the request unit, generating a job for printing the received image data, and sending the generated job to the printer, in a case where it is determined in the determination step determines that the printer is not able to print the image data in accordance with the print condition input by the input unit,
    wherein in a case that the print condition indicates a layout printing of a plurality of images, and in a case where the determination step determines that the printer is not able to print the image data in accordance with the print condition input in the input step, the server generates image data for printing an image in which the plurality of images are laid out in accordance with the print condition.

18. The print control method according to claim 17, wherein the print condition includes image format conversion.

19. The print control method according to claim 17, wherein the print condition includes layout print.

20. The print control method according to claim 17, wherein the server is connected to a communication network, and
    the method further comprises;
    a conversion step of converting image data received from the portable communication apparatus through the communication network in accordance with the print condition, and
    a transmission step of transmitting the image data converted in the conversion step to the portable communication apparatus through the communication network.

21. The print control method according to claim 17, further comprising:
    an instruction step of instructing to store, in the server, the image data processed by the server, and
    a reception step of receiving, from the server, a URL of the image data stored in the server.

22. The print control method according to claim 17, further comprising:
    a second obtaining step of obtaining a processing function of the server, and
    a setting step of setting print conditions inputtable in the input step on the basis of the information of the print function of the printer and the processing function of the server obtained in the second obtaining step.

23. The print control method according to claim 22, wherein in the setting step, the print conditions are set by selecting one of the processing function of the server and the print function of the printer.

24. The print control method according to claim 22, wherein in the setting step, the print conditions are set by combining the processing function of the server and the print function of the printer.

25. A control method of a portable communication apparatus for supplying image data to a printer and causing the printer to print the image data by a direct communication with the printer, comprising:
    an obtaining step of obtaining information of a print function of the printer by means of the direct communication with the printer;
    an input step of inputting print condition for printing image data stored in the portable communication apparatus;
    a determination step of determining, based on the information, whether or not the printer is able to print the image data in accordance with the print condition input in the input step;
    a request step of, in a case where it is determined in the determination step that the printer is not able to print the image data in accordance with the print condition input in the input step, requesting a server to execute corresponding image processing of the image data, through a communication network; and
    a print control step of:
    (i) generating a job corresponding to the print condition input in the input step and sending the job to the printer, in a case where it is determined in the determination step that the printer is able to print the image data in accordance with the print condition input in the input step, and
    (ii) receiving image data to which the corresponding image processing has been subjected by the server in accordance with a request by the request unit, generating a job for printing the received image data, and sending the generated job to the printer, in a case where it is determined in the determination step determines that the printer is not able to print the image data in accordance with the print condition input by the input unit,
    wherein in a case that the print condition indicates a layout printing of a plurality of images, and in a case where the determination step determines that the printer is not able to print the image data in accordance with the print condition input in the input step, the server generates image data for printing an image in which the plurality of images are laid out in accordance with the print condition.

* * * * *